US011699956B2

(12) United States Patent
Adragna et al.

(10) Patent No.: US 11,699,956 B2
(45) Date of Patent: Jul. 11, 2023

(54) CYCLE-BY-CYCLE REVERSE CURRENT LIMITING IN ACF CONVERTERS

(71) Applicant: STMicroelectronics S.r.l., Agrate Brianza (IT)

(72) Inventors: Claudio Adragna, Monza (IT); Francesco Ferrazza, Milan (IT)

(73) Assignee: STMicroelectronios S.r.l., Agrate Brianza (IT)

( * ) Notice: Subject to any disclaimer, the term of this patent is extended or adjusted under 35 U.S.C. 154(b) by 0 days.

(21) Appl. No.: 17/989,877

(22) Filed: Nov. 18, 2022

(65) Prior Publication Data

US 2023/0141001 A1 May 11, 2023

Related U.S. Application Data

(63) Continuation of application No. 17/523,651, filed on Nov. 10, 2021, now Pat. No. 11,552,573.

(51) Int. Cl.
*H02M 3/335* (2006.01)
*H02M 1/08* (2006.01)

(52) U.S. Cl.
CPC ......... *H02M 3/33569* (2013.01); *H02M 1/08* (2013.01)

(58) Field of Classification Search
CPC ............................ H02M 3/33569; H02M 1/08
USPC .......................................................... 327/540
See application file for complete search history.

(56) References Cited

U.S. PATENT DOCUMENTS 9,614,447 B2 * 4/2017 Liu .................. H02M 3/33569
9,954,456 B2 4/2018 Xue et al.
9,991,811 B1 6/2018 Song et al.
10,333,417 B2 6/2019 Song et al.
10,333,418 B2 6/2019 Song et al.
(Continued)

FOREIGN PATENT DOCUMENTS

CN 106169871 A 11/2016
CN 110545041 A 12/2019
(Continued)

OTHER PUBLICATIONS

Dalal, D., "Design Considerations for Active Clamp and Reset Technique," Active Clamp and Reset Technique, Texas Instruments, 2001, 24 pages.
(Continued)

*Primary Examiner* — Tomi Skibinski
(74) *Attorney, Agent, or Firm* — Slater Matsil, LLP

(57) ABSTRACT

In an embodiment, a method for operating an ACF converter includes: turning on a low-side transistor that is coupled between a primary winding of a transformer and a reference terminal to cause a forward current to enter the primary winding, turning off the low-side transistor; after turning off the low-side transistor, turning on a high-side transistor that is coupled between the primary winding and a clamp capacitor to cause a reverse current to flow through the primary winding; and after turning on the high-side transistor, when an overcurrent of the reverse current is not detected, keeping the high-side transistor on for a first period of time, and turning off the high-side transistor after the first period of time, and when the overcurrent of the reverse current is detected, turning off the high-side transistor without keeping the high-side transistor on for the first period of time.

20 Claims, 15 Drawing Sheets

(56) References Cited

U.S. PATENT DOCUMENTS

| | | | |
|---|---|---|---|
| 10,523,127 | B1 | 12/2019 | Xue et al. |
| 10,742,124 | B2 | 8/2020 | Chen et al. |
| 2010/0019692 | A1 | 1/2010 | Kimura |
| 2016/0344293 | A1 | 11/2016 | Hari et al. |

FOREIGN PATENT DOCUMENTS

| | | | |
|---|---|---|---|
| CN | 110611431 | A | 12/2019 |
| CN | 2021057058 | A1 | 4/2021 |
| CN | 113410994 | A | 9/2021 |
| WO | 2021042812 | A1 | 3/2021 |

OTHER PUBLICATIONS

Liu, P., "Comparison of GaN- and Silicon FET-Based Active Clamp Flyback Converters," Power Supply Design Seminar, Texas Instruments, SLUP380, 2018, 22 pages.

STMicroelectronics, "Primary Controller," L4990, L4990A, Jul. 1999, 24 pages.

* cited by examiner

Prior Art

CYCLE-BY-CYCLE REVERSE CURRENT LIMITING IN ACF CONVERTERS

CROSS-REFERENCE TO RELATED APPLICATIONS

This application is a continuation of U.S. application Ser. No. 17/523,651, filed on Nov. 10, 2021, which application is hereby incorporated by reference herein in its entirety.

TECHNICAL FIELD

The present disclosure relates generally to an electronic system and method, and, in particular embodiments, to a cycle-by-cycle reverse current limiting in active-clamp flyback (ACF) converters.

BACKGROUND

There are various topologies of switching converters, including buck, boost, buck-boost, and flyback converters. FIG. 1 shows a schematic diagram of exemplary flyback converter 100. Flyback converter 100 includes transformer 112, resistor 104, capacitors 106 and 114, diodes 108 and 116, transistor 102, and primary controller 110.

During normal operation, primary controller 110 turns on and off in a known manner transistor 102 to cause primary current $I_p$ to flow through primary winding 112*a*. Primary current $I_p$ induces the flow of secondary current $I_s$ through secondary winding 112*b*. Diode 116 cooperates with output capacitor 114 to operate as a rectifier so that output voltage $V_{out}$ is a DC voltage (e.g., with a superimposed ripple).

The topology of flyback converter 100 is also known as an RCD clamp flyback converter because converter 100 includes an RCD clamp circuit (formed by elements 104, 106, and 108). The purpose of this RCD clamp circuit is to dissipate that energy taken from the input source in each switching cycle and stored in the primary winding that is not transferred to the secondary winding because of the imperfect coupling between them. This unused energy is commonly referred to as the "leakage inductance energy" because it is assumed that it is stored in a portion of the primary inductance uncoupled to the secondary one called leakage inductance. RCD clamp flyback converters are generally simple and inexpensive circuits.

FIG. 2 shows a schematic diagram of exemplary flyback converter 200. Flyback converter 200 operates in a similar manner as flyback converter 100. Flyback converter 200, however, replaces the RCD clamp of converter 100 with an active clamp formed by transistor 208 and capacitor 106. Thus, the topology of flyback converter 200 is also known as an active clamp flyback (ACF) converter.

Advantages of ACF converters include the recycling of leakage inductance energy to achieve soft-switching (ZVS) for transistors 208 and 102, high efficiency (e.g., greater than 93%) achievable with high switching frequency (e.g., higher than 200 kHz), and smooth waveforms, which may result in low EMI.

SUMMARY

In accordance with an embodiment, a method for operating an active-clamp flyback (ACF) converter includes: turning on a low-side transistor that is coupled between a first terminal of a primary winding of a transformer and a reference terminal to cause a forward current to enter the primary winding via a second terminal of the primary winding and exit the primary winding via the first terminal of the primary winding; after turning on the low-side transistor, turning off the low-side transistor; after turning off the low-side transistor, turning on a high-side transistor that is coupled between the first terminal of the primary winding and a first terminal of a clamp capacitor to cause a reverse current to flow through the primary winding, where a second terminal of the clamp capacitor is coupled to the second terminal of the primary winding, and where the reverse current has opposite direction than the forward current; and after turning on the high-side transistor, when an overcurrent of the reverse current is not detected, keeping the high-side transistor on for a first period of time, and turning off the high-side transistor after the first period of time, and when the overcurrent of the reverse current is detected, turning off the high-side transistor without keeping the high-side transistor on for the first period of time.

In accordance with an embodiment, an active-clamp flyback (ACF) converter including: a transformer including primary and secondary windings; a low-side transistor having a current path coupled between a first terminal of the primary winding and a reference terminal; a clamp capacitor coupled to a second terminal of the primary winding; a high-side transistor having a current path coupled between the first terminal of the primary winding and the clamp capacitor; a current sensor configured to sense a reverse current flowing through the clamp capacitor, the reverse current having a direction from the clamp capacitor to the first terminal of the primary winding; and a primary controller configured to: turn on the low-side transistor to cause a forward current to enter the primary winding via the second terminal of the primary winding and exit the primary winding via the first terminal of the primary winding, after turning on the low-side transistor, turn off the low-side transistor, after turning off the low-side transistor, turn on the high-side transistor to cause the reverse current to flow through the primary winding, and after turning on the high-side transistor, detect whether an overcurrent of the reverse current exists based on an output of the current sensor, when the overcurrent of the reverse current is not detected, keep the high-side transistor on for a first period of time, and turn off the high-side transistor after the first period of time, and when the overcurrent of the reverse current is detected, turn off the high-side transistor without keeping the high-side transistor on for the first period of time.

In accordance with an embodiment, an integrated circuit including: a reference terminal configured to receive a reference voltage; a voltage sensing terminal configured to be coupled to a clamp capacitor via a sense capacitor and configured to be coupled to the reference terminal via a sense resistor; a first control terminal configured to be coupled to a control terminal of a high-side transistor having a current path coupled between the voltage sensing terminal and a first terminal of a primary winding of a transformer; a second control terminal configured to be coupled to a control terminal of a low-side transistor having a first current path terminal coupled to the current path of the high-side transistor; a comparator having a first input configured to receive a threshold voltage, a second input coupled to the voltage sensing terminal, and an output configured to provide an overcurrent detection signal; and a primary controller configured to: turn on the low-side transistor to cause a forward current to enter the primary winding via a second terminal of the primary winding and exit the primary winding via the first terminal of the primary winding, after turning on the low-side transistor, turn off the low-side transistor, after turning off the low-side transistor, turn on the high-side transistor to cause a reverse current to flow through the primary winding, the reverse current having opposite direction to the forward current, and after turning on the high-side transistor, detect whether an overcurrent of the reverse current exists based on the overcurrent detection signal, when the overcurrent detection signal is deasserted, keep the high-side transistor on for a first period of time, and turn off the high-side transistor after the first period of time, and when the overcurrent detection signal is asserted, turn off the high-side transistor without keeping the high-side transistor on for the first period of time.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

Figure 1:
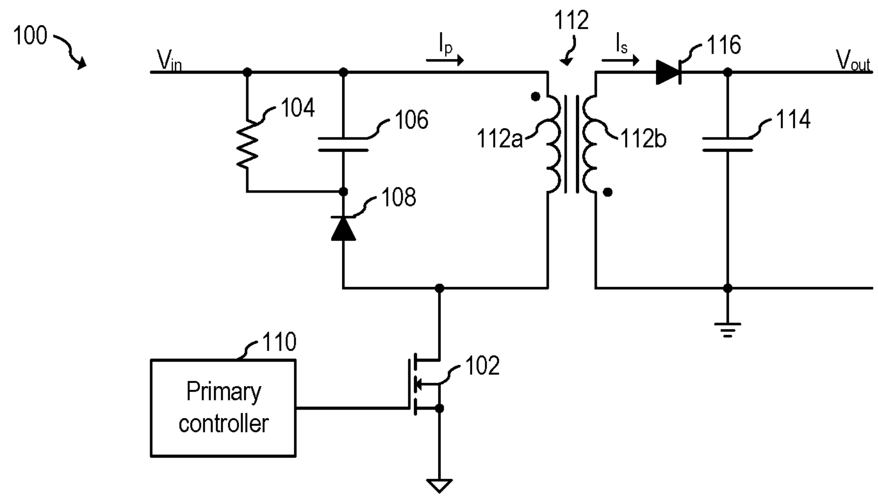
FIGS. 1 and 2 show schematic diagrams of exemplary flyback converters.
Figure 2:
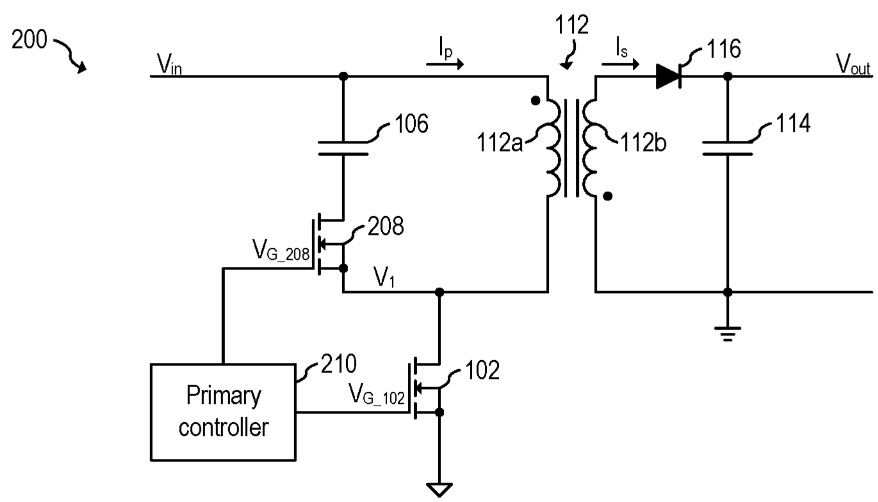

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in specific contexts, e.g., an ACF converter operating as a non-complementary ACF converter with a cycle-by-cycle reverse current limiting function for use in applications such as USB-PD type C. Embodiments of the present invention may be used in other types of applications.

In an embodiment of the present invention, the reverse current flowing through the high-side transistor of an ACF converter operating as a non-complementary ACF converter is limited, in a cycle-by-cycle basis, when an overcurrent event is detected in such reverse current. In some embodiments, the reverse current is limited by turning off early the high-side transistor of the ACF converter. In some embodiments, the typical dead-time between turning off the high-side transistor and the turning on of the low-side transistor is shortened (e.g., to a minimum dead-time) when turning off early the high-side transistor to limit the drain-to-source voltage of the low-side transistor when turning on the low-side transistor.

In some embodiments, an overcurrent event in the reverse current is detected by monitoring a current flowing through the high-side transistor of the ACF converter. In some embodiments, the current sensor includes a sense capacitor disposed dynamically in parallel with the clamp capacitor of the ACF converter.

In some embodiments, the overcurrent event in the reverse current is caused by a short circuit condition or by a negative output transition of the ACF converter. In some embodiments, during an overcurrent event caused by a short circuit condition, the soft-start function is activated to limit the current peak while the low-side transistor is on.

Figure 3A:
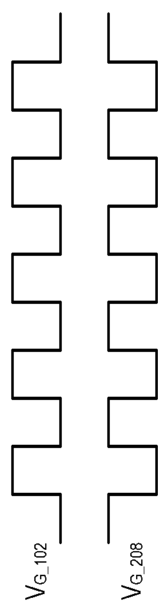
FIGS. 3A and 3B show exemplary waveforms associated with operating the flyback converter of FIG. 2 as a complementary ACF converter.
Figure 3B:
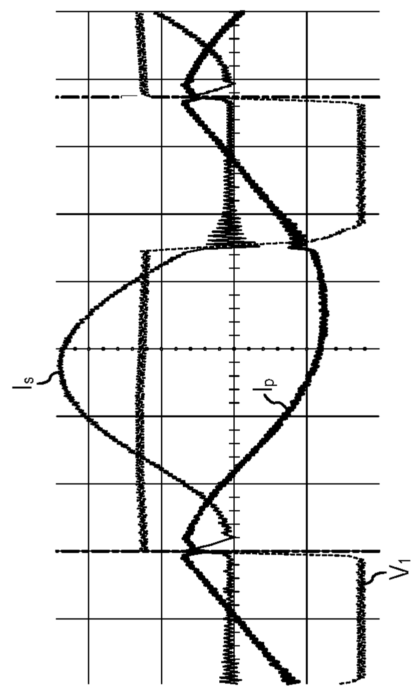

ACF converter 200 may be operated as a complementary ACF converter or as a non-complementary ACF converter. FIGS. 3A and 3B show exemplary waveforms associated with operating converter 200 as a complementary ACF converter.

As shown in FIG. 3A, signals $V_{G\_102}$ and $V_{G\_208}$ driving transistors 102 and 108, respectively, turn on and off in a complementary manner. Thus, transistor 102 is turned on when transistor 208 is turned off, and vice versa. As shown in FIG. 3B, when voltage $V_1$ is high (when transistor 102 is off and transistor 208 is on), the primary current $I_p$ and the secondary current $I_s$ have sinusoidal shapes. When voltage $V_1$ is low (when low-side transistor 102 is on and high-side transistor 208 is off) primary current $I_p$ has a straight-line shape while the secondary current $I_s$ is zero.

Figure 4A:
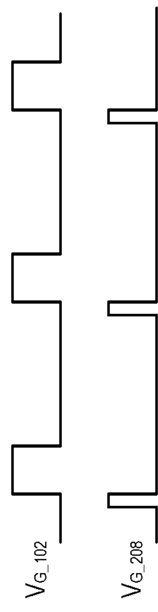
FIGS. 4A and 4B show exemplary waveforms associated with operating the flyback converter of FIG. 2 as a non-complementary ACF converter.
Figure 4B:
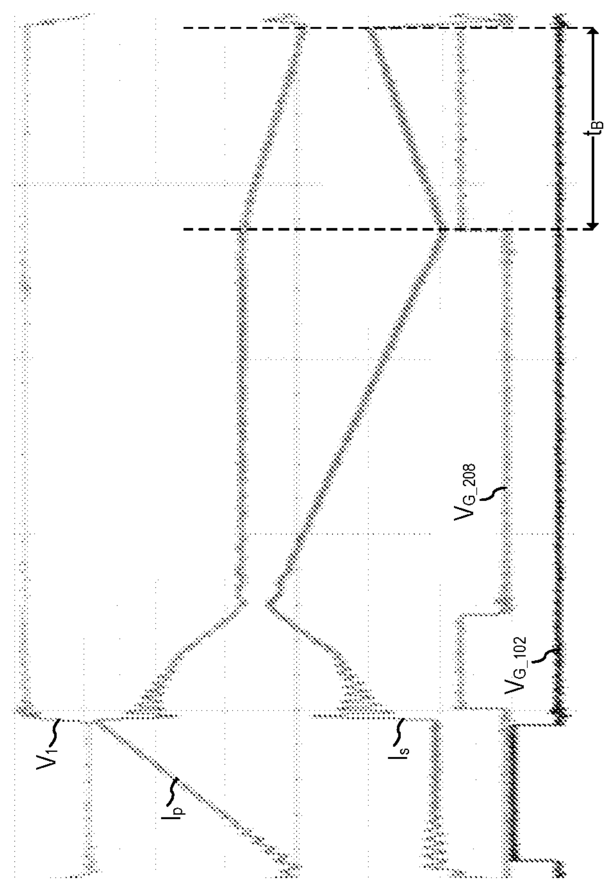

FIGS. 4A and 4B show exemplary waveforms associated with operating converter 200 as a non-complementary ACF converter. As shown in FIGS. 4A and 4B, transistor 208 is turned on after the secondary current $I_s$ demagnetizes for a period of time to allow the primary current $I_p$ to increase enough to achieve soft switching. As a result, there is simultaneous conduction on the primary and secondary side of the ACF converter 200.

Advantages of some embodiments operating ACF converters (e.g., 200) in a non-complementary manner (e.g., as illustrated in FIGS. 4A and 4B) include lower RMS current circulating on the primary side, lower power losses, higher efficiency, easy to manage broad input voltage $V_{in}$ and broad output voltage $V_{out}$ range, which may be particularly advantageous for applications such as USB Power Delivery (USB-PD).

As illustrated in FIG. 4B, during period $t_B$ (also referred to as a current bump period), there is positive current conduction for secondary current $I_s$ while there is reverse (negative) current conduction for primary current $I_p$. Although FIG. 4 illustrates secondary current $I_p$ as a straight line during the current bump period $t_B$, it is possible for current $I_s$ to have other shapes, such as a parabola or sinusoidal shape during the current bump period $t_B$.

Figure 5A:
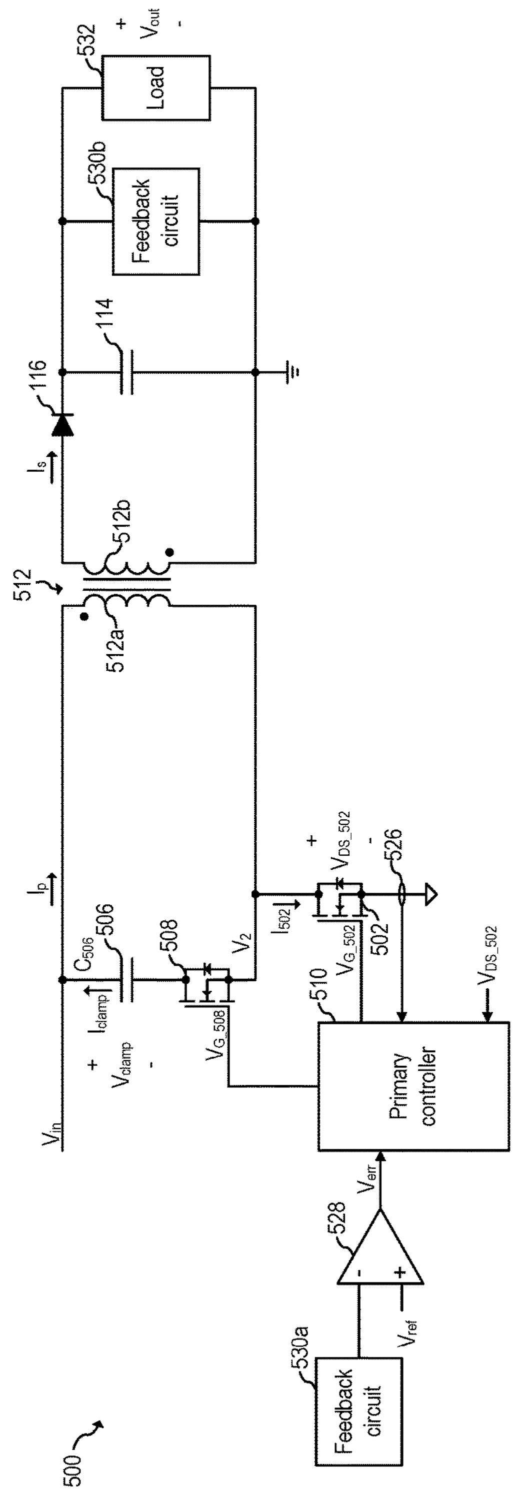
FIG. 5A shows a schematic diagram of an exemplary ACF converter that may be driven as a non-complementary ACF converter.

FIG. 5A shows a schematic diagram of exemplary ACF converter 500. ACF 500 includes transformer 512, feedback circuit 530, clamp capacitor 506, transistors 502, primary controller 510, current sensor 526, and error amplifier 528. Feedback circuit 530 includes primary portion 530*a* and secondary portion 530*b*. ACF converter 500 may be operated as a non-complementary ACF converter.

Feedback circuit 530 may be implemented in any way known in the art, such as by using optocouplers, for example.

Error amplifier 528 may implemented in any way known in the art, and may include, e.g., frequency compensation, and an amplification gain that may be higher than 1, equal to 1, or smaller than 1. Although error amplifier 528 is shown in the primary side, error amplifier 528 may be implemented in the secondary side. For example, portion 530*b* of feedback circuit 530 may include error amplifier 528, and error signal $V_{err}$ may be transmitted to primary controller 510, e.g., using an optocoupler.

Load 532 may be, e.g., a switching or linear voltage or current regulator, for example, other loads are also possible.

Current sensor 526 is configured to sense current $I_{502}$ flowing through transistor 502. Current sensor 526 may be implemented in any way known in the art. For example, in some embodiments, current sensor 526 may determine current $I_{502}$ based on drain-to-source voltage $V_{DS\_502}$. Other implementations are also possible.

Transistors 502 and 508 may be, e.g., metal-oxide semiconductor field-effect transistors (MOSFETs). Other transistor types, such as GaN transistors, may also be used.

During non-complementary operation, primary controller 510 is configured to turn on and off transistors 502 and 508 based on error voltage $V_{err}$ to regulate output voltage $V_{out}$. For example, in some embodiments, the time that transistor 502 is kept on may be based on the error voltage $V_{err}$.

Primary controller 510 is also configured to introduce a dead-time $t_d$ between the turning off of transistor 508 and the turning on of transistor 502 to let the drain-to-source voltage $V_{DS\_502}$ of transistor 502 swing down to zero to achieve zero-voltage switching (ZVS), also referred to as soft-switching. Dead-time $t_d$ may be, e.g., 300 ns. Other values may also be used.

Figure 5E:
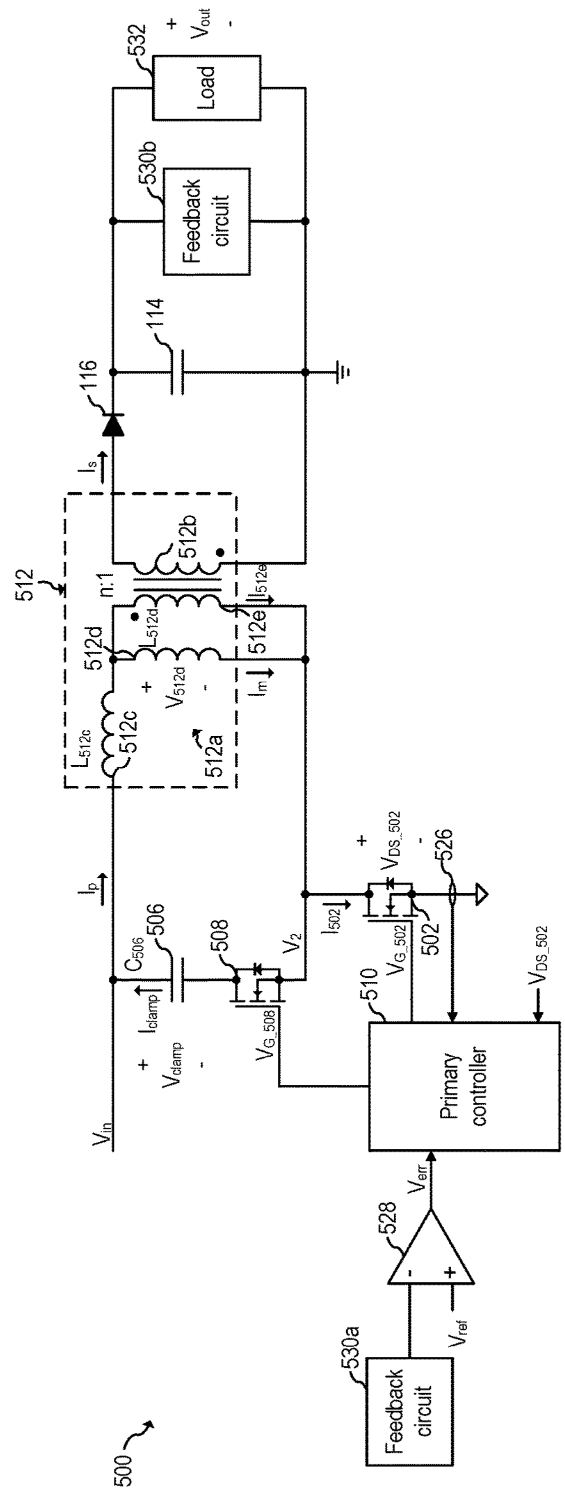
FIG. 5E shows a schematic diagram of the ACF converter of FIG. 5A illustrating a model for the transformer of the ACF converter of FIG. 5A.
Figure 5B:
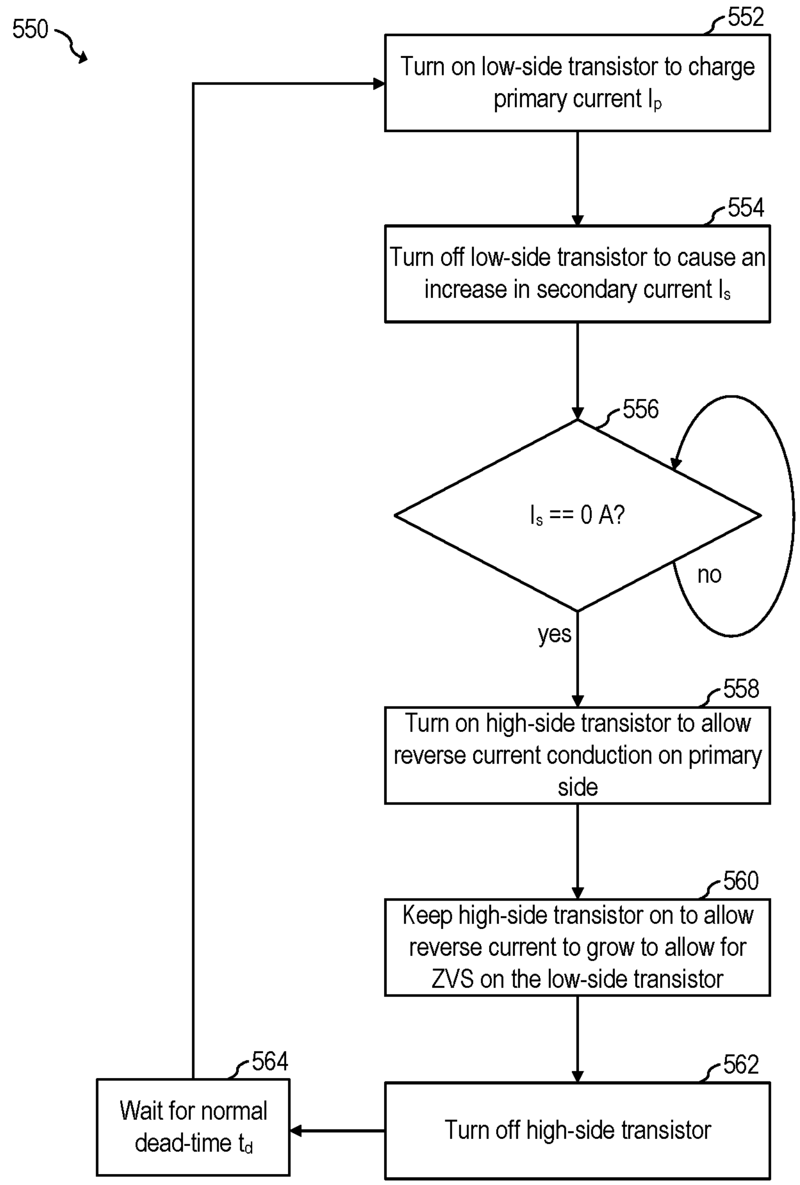
FIG. 5B shows a flow chart of an exemplary method for operating the ACF converter of FIG. 5A.
Figure 5C:
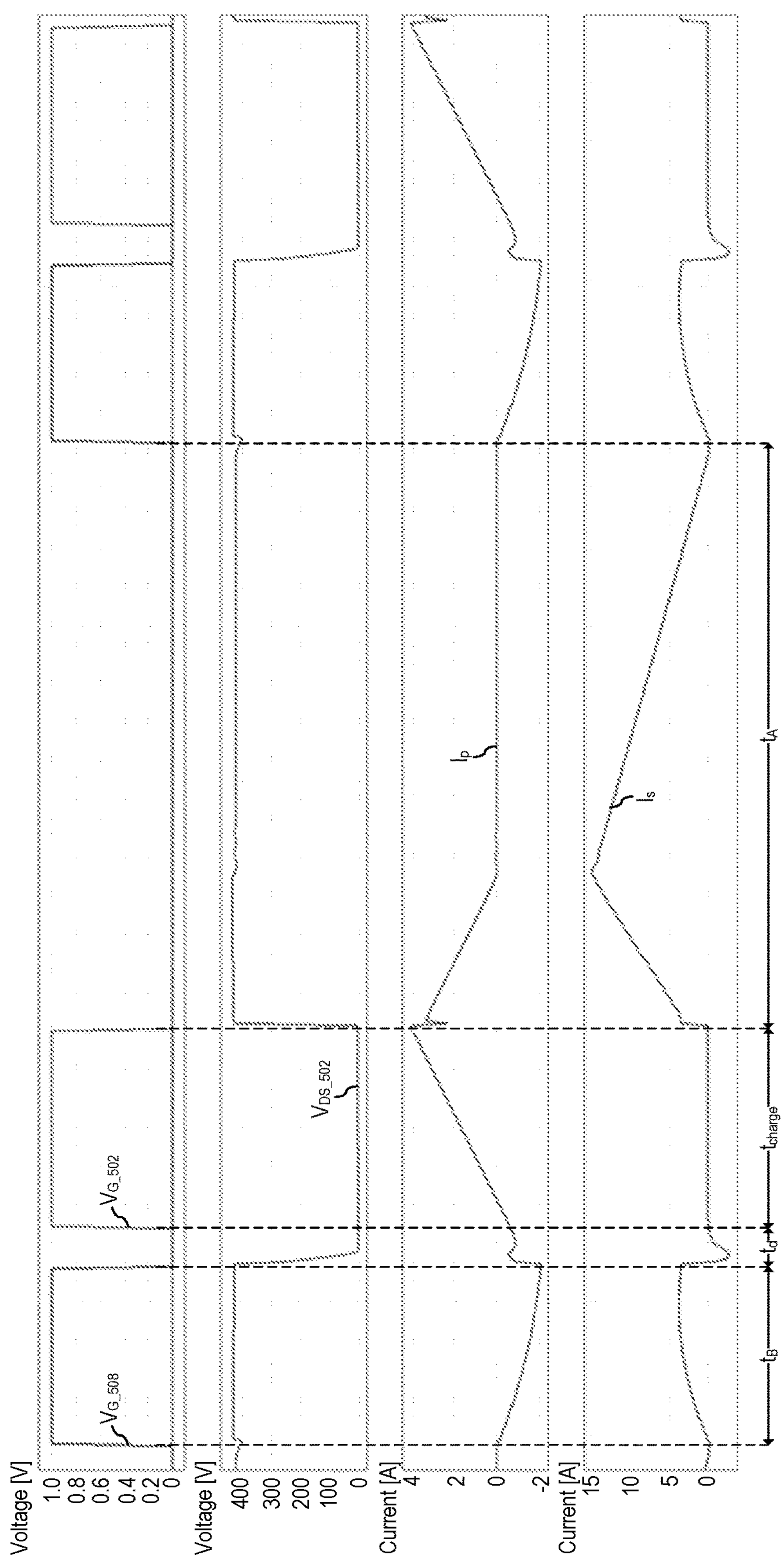
FIG. 5C illustrates exemplary waveforms associated with the ACF converter of FIG. 5A during steady state.

FIG. 5B shows a flow chart of exemplary method 550 for operating ACF converter 500. FIG. 5C illustrates exemplary waveforms associated with ACF converter 500 during steady state. Method 550 may be implemented by primary controller 510. FIGS. 5B and 5C may be understood together.

During step 552, primary controller 510 turns on low-side transistor 502 to charge primary current $I_p$ (to cause an increase in primary current $I_p$), as illustrated by period $t_{charge}$ in FIG. 5C.

Once primary current $I_p$ reaches a predetermined threshold, primary controller 510 turns off low-side transistor during step 554 to cause an increase in secondary current $I_s$. As a result, secondary current $I_s$ increases for a period of time, and then begins to decrease. Once it is determined that secondary current $I_s$ decreases to 0 A (step 556), primary controller 510 turns on high-side transistor 508 (during step 558) to allow reverse current ($-I_{clamp}$) to flow through primary winding 512*a* (at the beginning of period $t_B$, as shown in FIG. 5C).

During step 560, high-side transistor 508 is kept on to allow reverse current to grow, as illustrated by current bump period $t_B$ in FIG. 5C. Once the reverse current grows sufficiently (e.g., reaches a predetermined threshold, or by controlling the on-time of high-side transistor 508 directly), high-side transistor 508 is turned off during step 562. In some embodiments, the period of time in which the high-side transistor 508 is kept on during step 560 varies e.g., when voltages $V_{in}$ or $V_{out}$ change.

During step 564, controller 510 waits for a dead-time period td to allow for current $I_p$ to cause a drop in voltage $V_{DS\_502}$ to allow for ZVS. After dead-time td has elapsed, low-side transistor 502 is turned on again during step 552, repeating the sequence.

As shown in FIG. 5C, during steady state (e.g., when powering a load), dead-time $t_d$ is introduced between the turning off of transistor 508 and the turning on of transistor 502. As also shown in FIG. 5C, voltage $V_{DS\_502}$ is already at or substantially at 0 V by the time transistor 502 is turned on.

Primary controller 510 may also be configured to perform a soft-start during startup of ACF converter 500. For example, during startup, capacitor 114 may be fully discharged and may cause an initial stress, e.g., similar to a short-circuit condition. Under such condition, ACF converter 500 may provide maximum current to bring up the output voltage $V_{out}$. To prevent a high spike of secondary current $I_s$, which may cause a corresponding spike of primary current $I_p$, the power capability of ACF converter 500 is initially limited and is slowly increased from a predefined minimum to its full range. Such power-limiting function, also referred to as soft-start function, may cause the slow, e.g., linear increase of the output voltage $V_{out}$. For example, FIG. 5D shows exemplary waveforms associated with ACF converter 500 during startup.

Figure 5D:
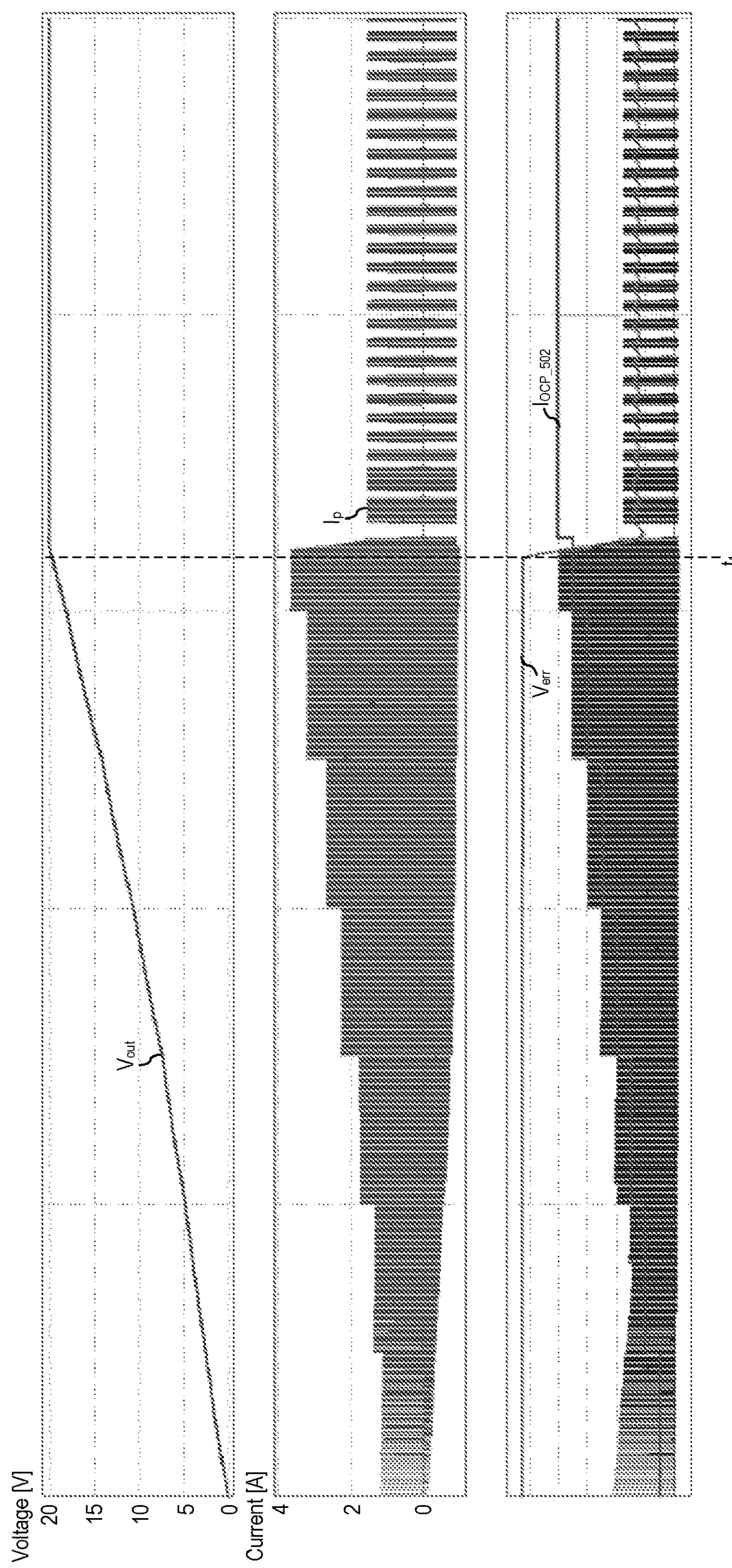
FIG. 5D shows exemplary waveforms associated with the ACF converter of FIG. 5A during startup.

As shown in FIG. 5D, output voltage $V_{out}$ increases slowly during startup. As the output voltage $V_{out}$ increases, the overcurrent limit $I_{OCP\_502}$ for limiting the current flowing through transistor 502 also increases, e.g., in a staircase manner.

Error voltage $V_{err}$ may be a voltage between a maximum voltage $V_{err\_max}$ and a minimum voltage $V_{err\_min}$. Primary controller 510 may use error voltage $V_{err}$ to determine when to turn off low-side transistor 502 (e.g., to regulate output voltage $V_{out}$ to a target output voltage). As a non-limiting example, voltages $V_{err\_max}$ and $V_{err\_min}$ may be, e.g., 3 V and 1 V, respectively.

As shown in FIG. 5D, error voltage $V_{err}$ is initially saturated (e.g., high) since the output voltage is substantially lower than the target output voltage (which is 20 V in the example shown). At time $t_1$, once output voltage $V_{out}$ is near the target output voltage, error voltage $V_{err}$ exits saturation and primary controller 510 enters regulation mode.

FIG. 5E shows a schematic diagram of ACF converter 500 illustrating a model for transformer 512, e.g., during the current bump period $t_B$. As shown in FIG. 5E, transformer 512 may be modeled with a leakage inductance 512*c*, a magnetizing inductance 512*d*, and an ideal n:1 transformer (including ideal windings 512*e* and 512*b*).

As shown in FIG. 5E, secondary current $I_s$ may be given by $$I_s(t)=-n\cdot I_{512e}=-n\cdot[I_p-I_m] \tag{1}$$

where n is the turns ratio of transformer 512, $I_{512e}$ (also referred to as the forward component of primary current $I_p$) represents the current flowing through ideal winding 512*e*, and magnetizing current $I_m$ represents the current flowing through the magnetizing inductance 512*d*. Magnetizing current $I_m$ may be responsible for allowing ZVS, e.g., as illustrated in FIG. 5C.

During the current bump period $t_B$, transistor 508 is on, transistor 502 is off, transformer 512 operates as a real transformer in forward mode, and diode 116 is conducting, which causes voltage $V_{512d}$ to be, e.g., fixed, and which may be given by $$V_{512d}-V_{out}\cdot n \tag{2}$$

Thus, during the current bump period $t_B$, the magnetizing current $I_m$ may be given by $$I_m(t)=-\frac{V_{512d}}{L_{512d}}\cdot t \tag{3}$$

where $L_{512d}$ is the inductance of magnetizing inductor 512*d* (also referred to as the magnetizing inductance of transformer 512). As illustrated by Equation 3, the magnetizing current $I_m$ may be a linear ramp.

During the current bump period $t_B$, primary current $I_p$ may be given by $$I_p=-\frac{V_{clamp\_o}-V_{512d}}{Z_{512}}\cdot\sin(w_{512}\cdot t)+I_M(t) \tag{4}$$

where $V_{clamp\_0}$ represents the voltage $V_{clamp}$ across capacitor 506 at the start of each switching cycle (e.g., at the instant when high-side transistor 508 is turned on), $\omega_{512}$ represents the frequency of the sinusoidal component of primary current $I_p$, which may be given by $$w_{512}=\frac{1}{\sqrt{L_{512c}\cdot C_{506}}}, \tag{5}$$

and where $Z_{512}$ represents the characteristic impedance of the system, which may be given by $$Z_{512}=\sqrt{\frac{L_{512c}}{C_{506}}}. \tag{6}$$

As illustrated by Equation 4, during the current bump period, primary current $I_p$ has a linear component ($I_m$) and a sinusoidal component ($I_{512e}$), as also illustrated in FIG. 5C.

As illustrated by Equations 5 and 6, capacitor 506 resonates with leakage inductor 512*c*. As also illustrated by Equations 5 and 6, inductor 512*d* may not play a role in the resonance because voltage $V_{512}$ is fixed during the current bump period $t_B$. For example, the windings 512*e* and 512*b* may be understood as a coupling circuit where the voltage across 512*b* equals the voltage across 512*e* divided by n and the current through 512*b* equal the current through 512*e* multiplied by n.

As a non-limiting example, typical value ranges for the components of ACF converter 500 include an inductance $L_{512e}$ in the range of the low μH (e.g., 1 μH to 10 μH), and a capacitance $C_{506}$ in the range of the tens or hundreds of nF (e.g., 10 nF to 470 nF), which may result in an impedance $Z_{512}$ in the range of a few Ω.

As illustrated by Equations 1 and 4, during the current bump period, the maximum magnitude of currents $I_{512e}$ and $I_s$ may be proportional to $V_{506\_0}-V_{512d}$. Under steady state condition, voltage $V_{clamp\_0}$ may be only slightly higher than voltage $V_{512d}$. Thus, during steady state condition, forward component $I_{512e}$ of primary current $I_p$ (and the corresponding current bump in secondary current $I_s$) maybe relatively limited.

The inventors realized that during a short circuit condition, output voltage $V_{out}$ drops, which causes a corresponding drop in voltage $V_{512d}$ (e.g., to 0 V or substantially 0 V), which causes the difference $V_{clamp\_0}-V_{512d}$ (and, equivalently, the difference:

$$\frac{V_{clamp\_o}}{n}-V_{out}$$

) to increase, thus causing primary current $I_p$ to substantially increase. Since during a short circuit condition, voltage $V_{512d}$ drops substantially (e.g., to 0 V or substantially 0 V), the magnetizing current $I_m$ also drops substantially (e.g., to 0 A), causing the magnitude of the secondary current $I_s$ to exhibit an even larger current increase than the primary current $I_p$ (since the term $I_m$ becomes negligible or very small in Equation 1). During a short circuit condition, the peaks of currents $I_p$ and $I_s$ may be substantially higher than during steady state condition, such as 8 to 10 times higher than during steady state condition.

The inventors also realized that in an ACF converter with variable output voltage (such as for use with USB-PD) a negative output transition (e.g., from 20 V to 5 V) may also cause current spikes in the primary current $I_p$ and secondary current $I_s$. For example, during a negative output transition (e.g., changing the target output voltage from 20 V to 5 V), ACF converter 500 may stop switching until the output voltage $V_{out}$ reaches the target output voltage. Upon restarting switching of transistor 508, voltage $V_{clamp}$ may be much higher than voltage $V_{512d}$ (since at the time of restarting switching voltage $V_{512d}$ has a value corresponding to the new output voltage (e.g., 5 V) and voltage $V_{clamp}$ has a value corresponding to the previous higher voltage (e.g., 20 V). Although less pronounced than during a short circuit condition, current spikes for the primary and secondary currents ($I_p$ and $I_s$) may develop upon restarting switching after a negative output transition.

Figure 5F:
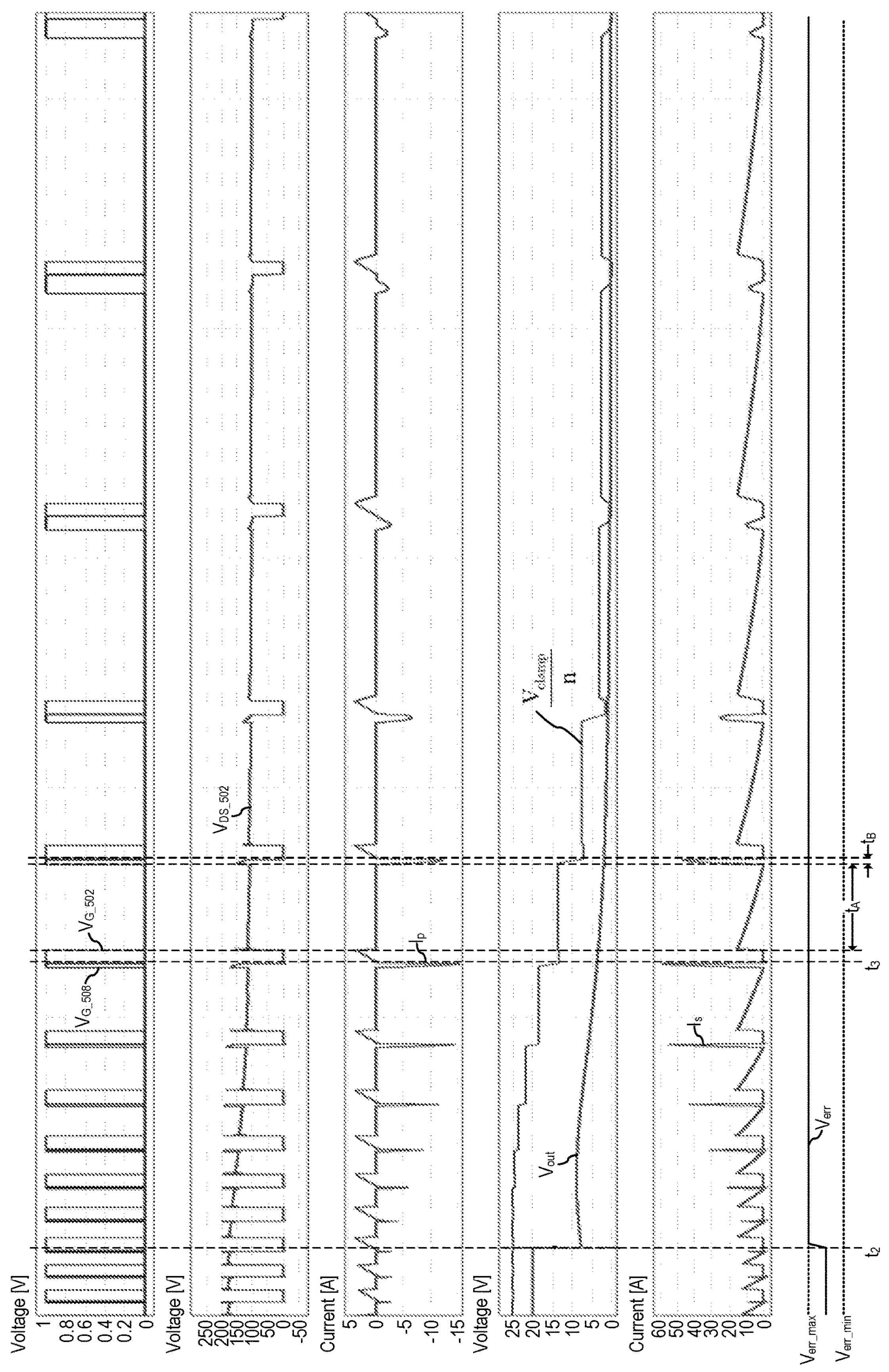
FIGS. 5F and 5G show waveforms associated with the ACF converter of FIG. 5A during a short circuit condition and a negative output transition, respectively.
Figure 5G:
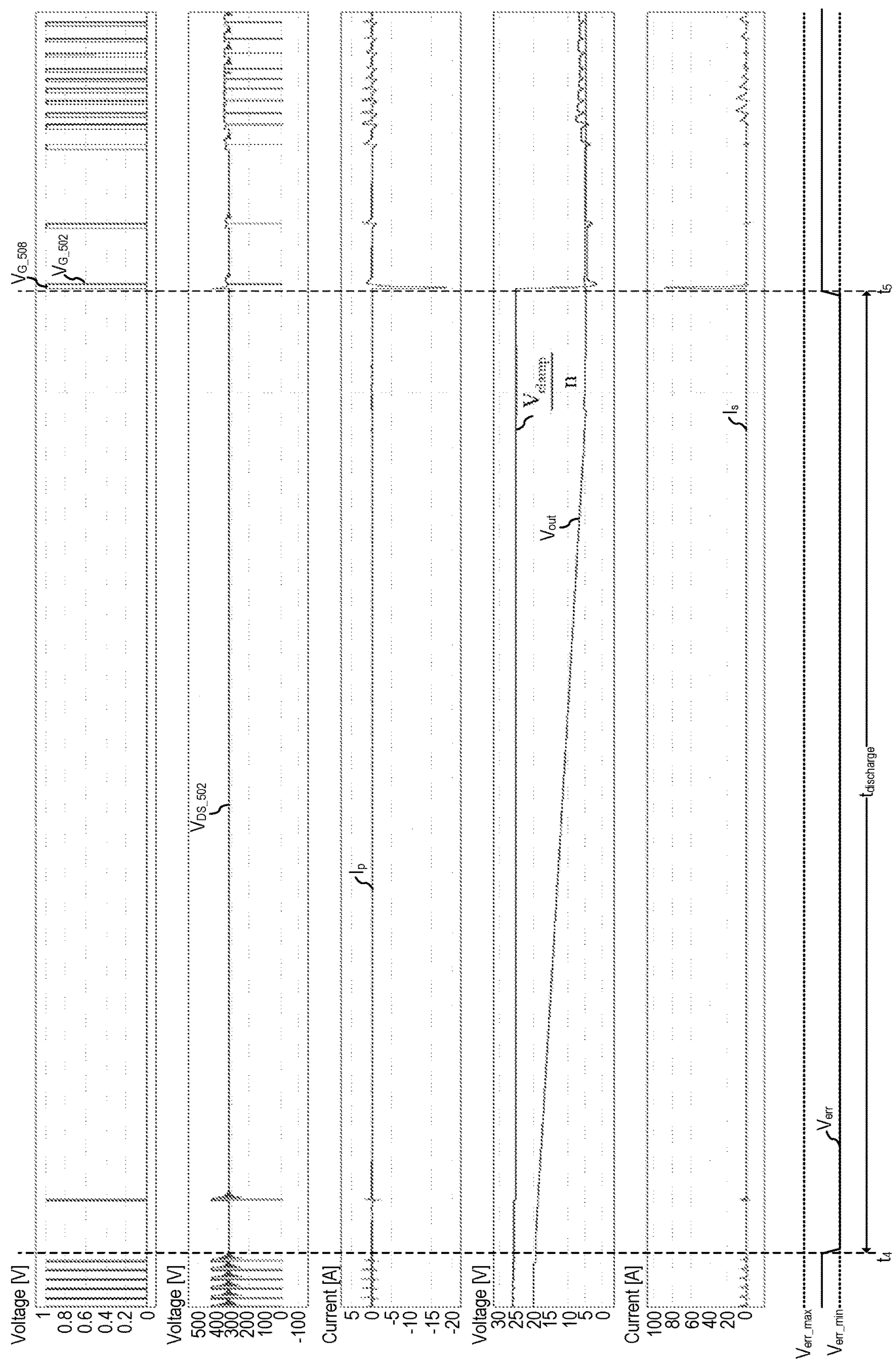

FIGS. 5F and 5G show waveforms associated with ACF converter 500 during a short circuit condition and a negative output transition, respectively.

As shown in FIG. 5F, a short circuit condition is applied at time $t_2$. After application of the short circuit condition at time $t_2$, the magnitude of the peak currents for primary current $I_p$ and secondary current $I_s$ increase until reaching a maximum at time $t_3$ of about −15 A and about 60 A, respectively (compared with about −3.5 A and about 10 A during steady state).

As shown in FIG. 5G, a negative output transition from 20 V to 5 V is applied at time $t_4$. For example, such negative output transition may arise as a result of unplugging a laptop (e.g., being charged at 20 V) from a USB connector implementing USB-PD. Upon disconnection of the laptop, a discharge circuit (not shown) discharges the output voltage $V_{out}$ (e.g., within 100 ms). During such discharge time $t_{discharge}$, transistors 502 and 508 do not switch (or substantially do not switch). Since there is little or no switching during the discharge time $t_{discharge}$, voltage $V_{clamp}$ preserves or substantially preserves its voltage during the discharge time $t_{discharge}$. As a result, upon restarting switching at time $t_5$, the difference $$\frac{V_{clamp\_o}}{n} - V_{out}$$

(and, equivalently, the difference: $V_{clamp\_0}-V_{512d}$) is higher than during steady state, thus causing current spikes in the primary and secondary currents $I_p$ and $I_s$, as shown in FIG. 5F. For example, as shown in FIG. 5F, current spikes of about −18 A and 88 A for currents $I_p$ and $I_s$, respectively, may develop.

Such higher current peaks (e.g., developed as a result of a short circuit condition or a negative output transition, as shown, e.g., in FIGS. 5F and 5G) may add stress to the components of ACF converter 500.

The duration of the current bump period $t_B$ may be inversely proportional to the output voltage. Thus, an output voltage $V_{out}$ drop (e.g., during a short circuit condition or a negative output transition) may cause the duration of current bump period $t_B$ to increase. For example, as shown in FIGS. 5F and 5G, the duration of the current peaks during the current bump period $t_B$ after the output voltage drops (e.g., after time $t_2$) are longer than during steady state condition (e.g., prior to time $t_2$).

Figure 6:
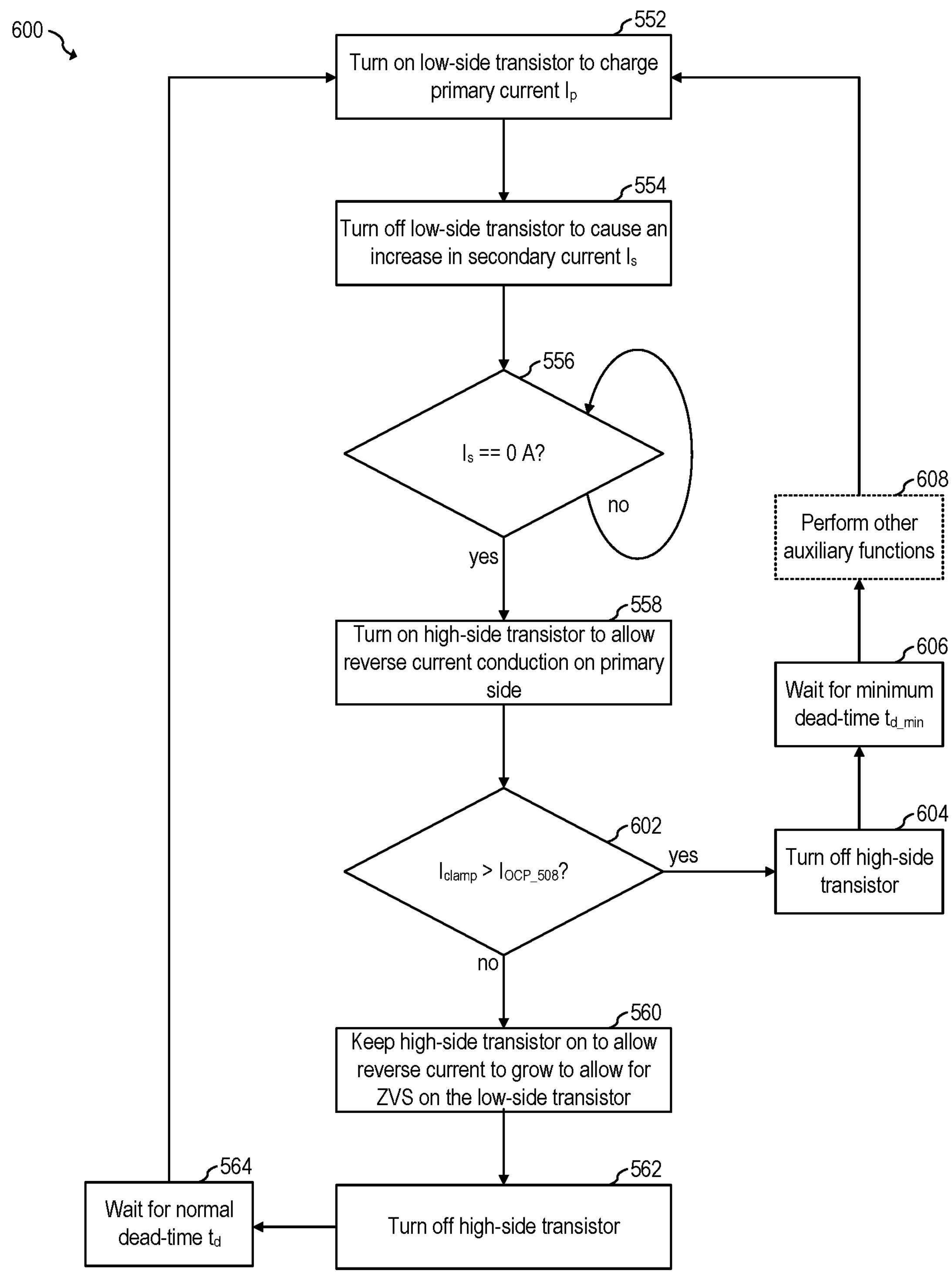
FIG. 6 shows a flow chart of an embodiment method for operating a non-complementary ACF converter, according to an embodiment of the present invention.

The inventors realized that current spikes developed during the current bump period $t_B$ may be limited by turning off transistor 508. For example, in some embodiments, current $I_{clamp}$ flowing through transistor 508 maybe monitored (e.g., in a cycle-by-cycle manner) during the current bump period $t_B$. If current $I_{clamp}$ exceeds (e.g., during a switching cycle) a predetermined threshold $I_{OCP\_508}$, transistor 508 is (e.g., immediately) turned off (e.g., for the rest of the switching cycle). For example, FIG. 6 shows a flow chart of embodiment method 600 for of operating a non-complementary ACF converter, according to an embodiment of the present invention. Method 600 includes steps 552, 554, 556, 558, 560, 562, 564, 602, 604, and 606. In some embodiments, steps 552, 554, 556, 558, 560, 562, and 564 may be performed in a similar manner as in method 550.

Figure 7:
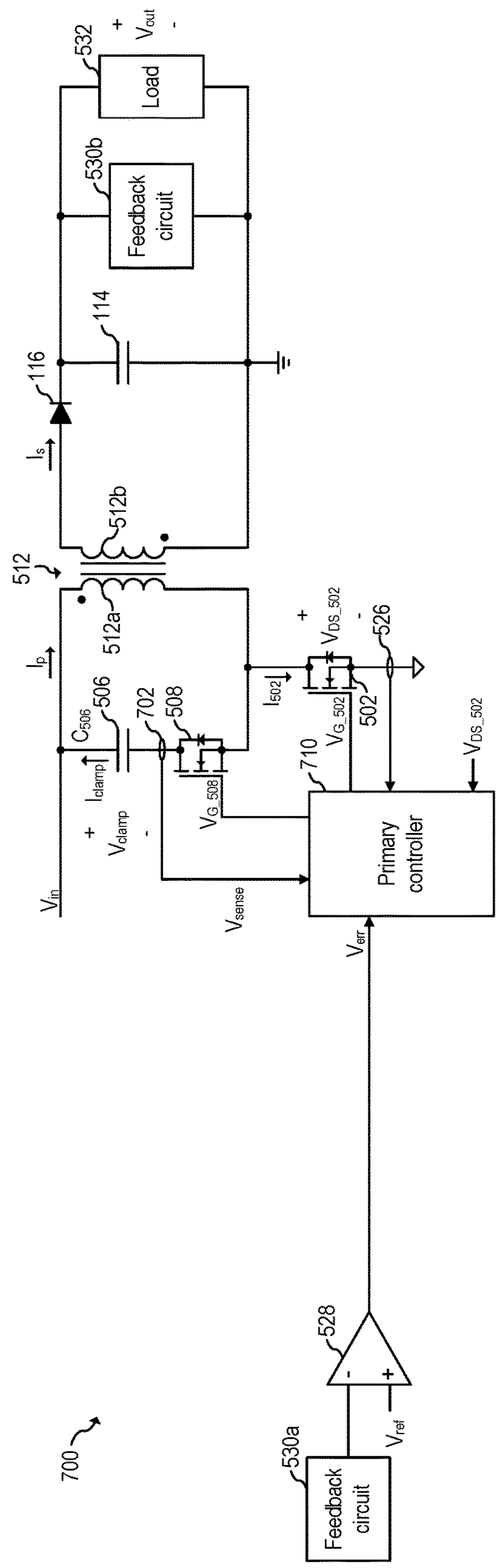
FIG. 7 shows an ACF converter, according to an embodiment of the present invention.

FIG. 7 shows ACF converter 700, according to an embodiment of the present invention. ACF converter 700 includes primary controller 710, transistors 502 and 508, capacitors 506 and 114, feedback circuit 530, transformer 512, current sensors 526 and 702, and error amplifier 528. Primary controller 710 may implement method 600. FIGS. 6 and 7 may be understood together.

In some embodiments, current sensor 702 maybe implemented with a current transformer. As will be described in more detail below, in some embodiments, current sensor 702 maybe implemented using a sense capacitor.

In some embodiments, diode 116 may be replaced, in a known manner, with a synchronous rectifier (SR) transistor and SR controller for performing synchronous rectification. By using an SR transistor and SR controller, some embodiments may advantageously achieve reduced power losses and increased efficiency.

In some embodiments, primary controller 710 maybe implemented using a generic or custom micro-controller or processor, e.g., coupled to a memory and configured to execute instructions stored in such memory. Other implementations, such as including a hard-coded finite state machine (FSM) are also possible.

As shown in FIG. 6, (e.g., immediately) after turning on the high-side transistor (step 558), clamp current $I_{clamp}$ is measured and compared with a predetermined threshold $I_{OCP\_508}$ during step 602. If the magnitude of the reverse current does not exceed the predetermined threshold ($I_{OCP\_508}$), steps 560, 562, and 564 are performed, e.g., in a similar manner as described with respect to method 550. If the magnitude of the reverse current exceeds the predetermined threshold ($I_{OCP\_508}$), the high-side transistor 508 is (e.g., immediately) turned off during step 604. By turning off high-side transistor 508 during step 604, reverse current is advantageously limited since it is blocked by the body diode of high-side transistor 508.

The inventors realized that if controller 710 waits for the normal dead-time td after turning off high-side transistor 508, voltage $V_{DS\_502}$ may bounce back up (since the reverse current is blocked by the body diode of high-side transistor 508 and the reverse current may not grow sufficiently to allow for ZVS), and the low-side transistor 502 may be turned on with hard-switching. For example, FIG. 8 shows waveforms associated with ACF 700 when turning on transistor 502 after waiting for dead-time $t_d$ after turning off high-side transistor 508 during step 604, according to an embodiment of the present invention.

Figure 8:
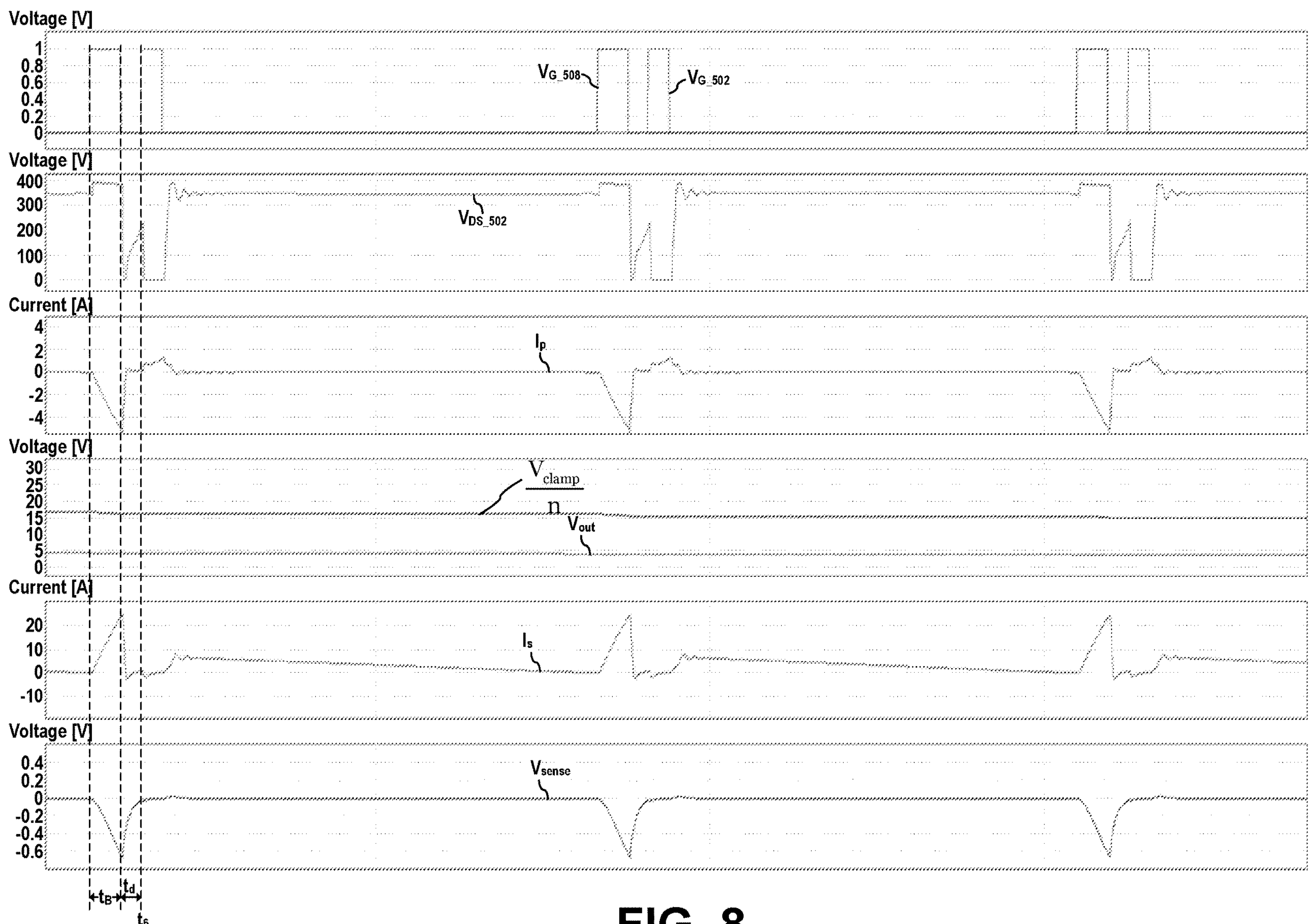
FIG. 8 shows waveforms associated with the ACF of FIG. 7, according to an embodiment of the present invention.

As shown in FIG. 8, after dead-time $t_d$ has elapsed after turning off transistor 508, voltage $V_{DS\_502}$ is higher than 200 V by the time transistor 502 is turned on during time $t_6$. Thus, in some embodiments, as shown in FIG. 6, the low-side transistor 502 is turned on (step 552) after a minimum dead-time $t_{d\_min}$ (step 606) after turning off the high-side transistor 508 (during step 604), where $t_{d\_min}<t_d$. In some embodiments, minimum dead-time $t_{d\_min}$ is substantially smaller than normal dead-time $t_d$. For example, in some embodiments, minimum dead-time $t_{d\_min}$ is, e.g., the minimum dead-time to avoid cross-conduction between the high-side transistor 508 and low-side transistor 502. For example, in some embodiments, $t_{d\_min}$ is at least one half shorter (e.g., one third, one fourth, or shorter) than $t_d$. For example, in some embodiments, minimum dead-time $t_{d\_min}$ (step 606) is 80 ns while normal dead-time $t_d$ (step 564) is 300 ns. Other values may also be used.

As will be described in more detail below with respect to FIG. 11, some embodiments may implement additional auxiliary functions during step 608.

By turning on low-side transistor 502 shortly after turning off high-side transistor 508, some embodiments advantageously achieve either ZVS or turn on transistor 502 at a lower voltage than if waiting for the normal dead-time $t_d$.

Figure 9A:
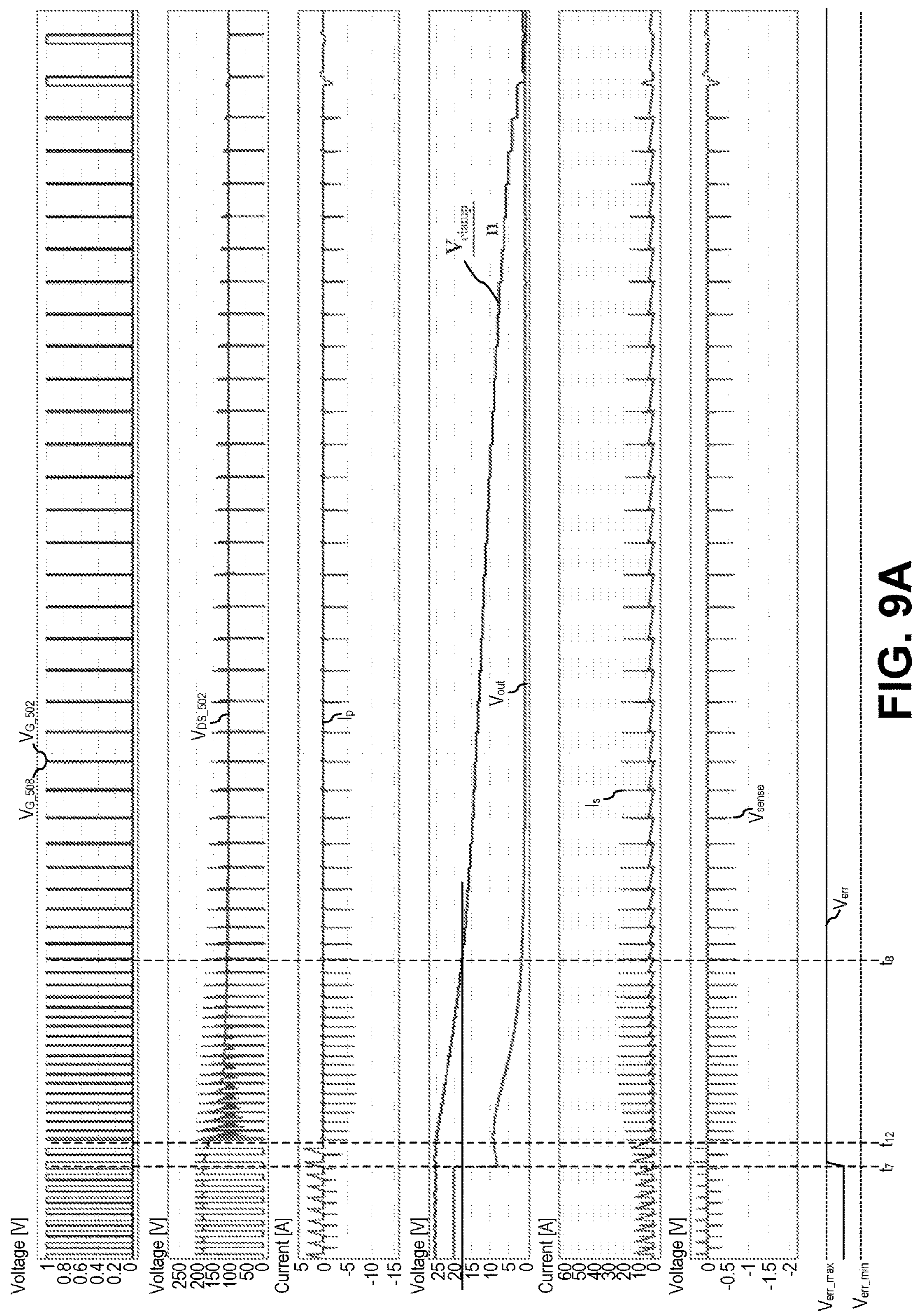
FIGS. 9A, 9B and 10 show waveforms associated with the ACF converter of FIG. 7 implementing the method of FIG. 6, according to an embodiment of the present invention.

FIG. 9A shows waveforms associated with ACF converter 700 implementing method 600 during a short circuit condition, according to an embodiment of the present invention.

As shown in FIG. 9A, a short circuit condition is applied at time $t_7$. As a result, output voltage $V_{out}$ drops, and the difference $$\frac{V_{clamp\_o}}{n} - V_{out}$$

(and, equivalently, the difference: $V_{clamp\_o}-V_{512d}$) increases. However, since transistor 508 is turned off (step 604) shortly after detecting (step 602) an overcurrent of $I_{clamp}$ (in a cycle-by-cycle manner), the peak currents of the primary current $I_p$ and secondary current $I_s$ are limited. For example, as shown in FIG. 9A, using method 600, the magnitude of the current peaks for currents $I_p$ and $I_s$ is advantageously limited to about −7 A and about 24 A, respectively (compared with about −18 A and 88 A in the example of FIG. 5F).

As shown in FIG. 9A, the current bump period $t_B$ is also shorter using method 600, since the turning off of transistor 508 (step 604) and the shorter dead-time (step 606) causes period $t_B$ to be shorter compared with the current bump period $t_B$ of the example of FIG. 5F (using method 550).

Figure 9B:
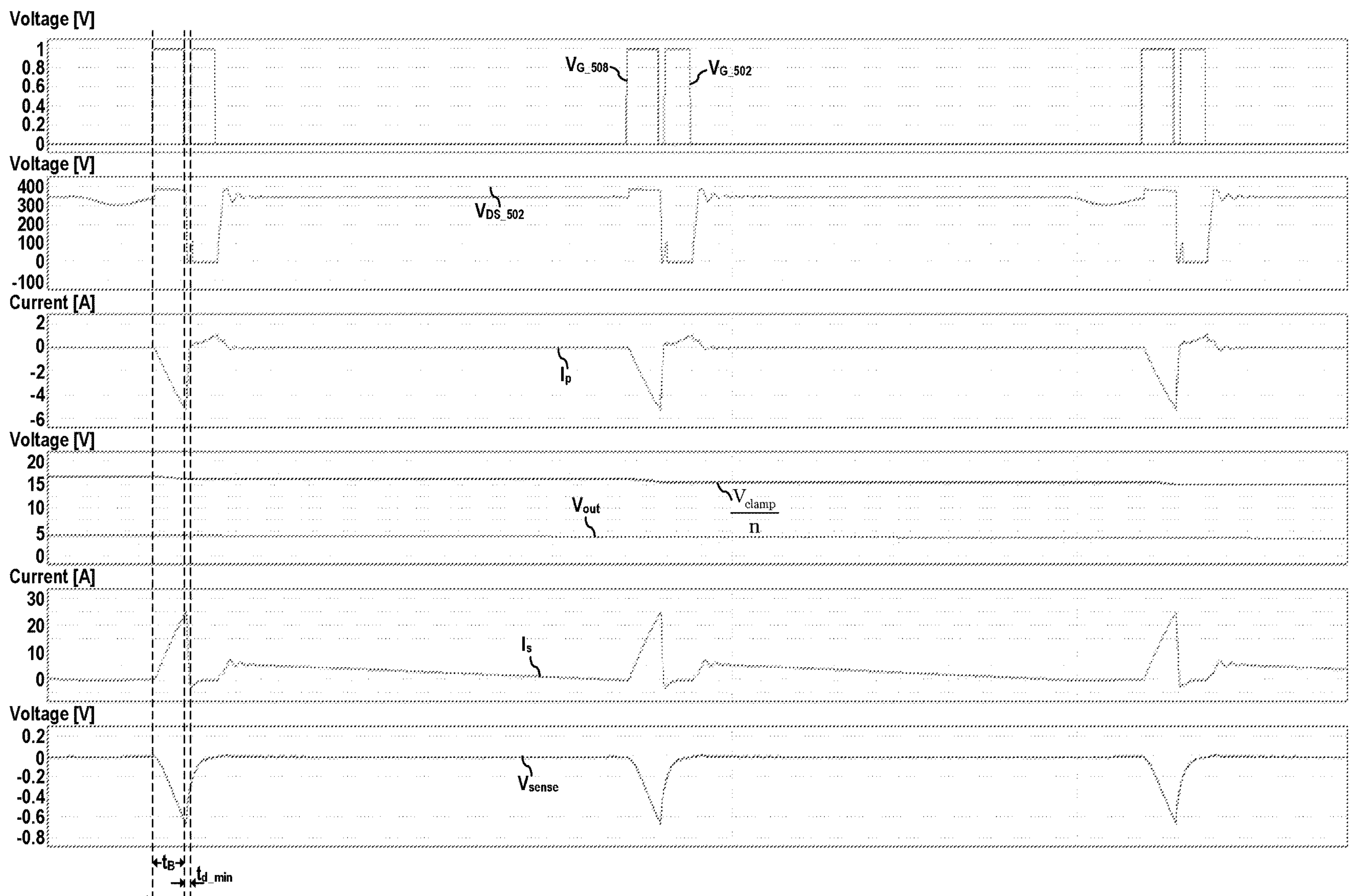

FIG. 9B shows a zoomed-in version of the waveforms of FIG. 9A at time $t_8$, according to an embodiment of the present invention. As shown in FIG. 9B, low-side transistor 502 is turned on (step 552) at time $t_9$, which occurs immediately after minimum dead-time $t_{d\_min}$ (step 606).

As shown in FIG. 9B, the drain-to-source voltage $V_{DS\_502}$ at time $t_9$ is about 100 V, which is advantageously smaller than when waiting for the normal dead-time $t_d$ (such as smaller than the more than 200 V illustrated in FIG. 8).

Figure 10:
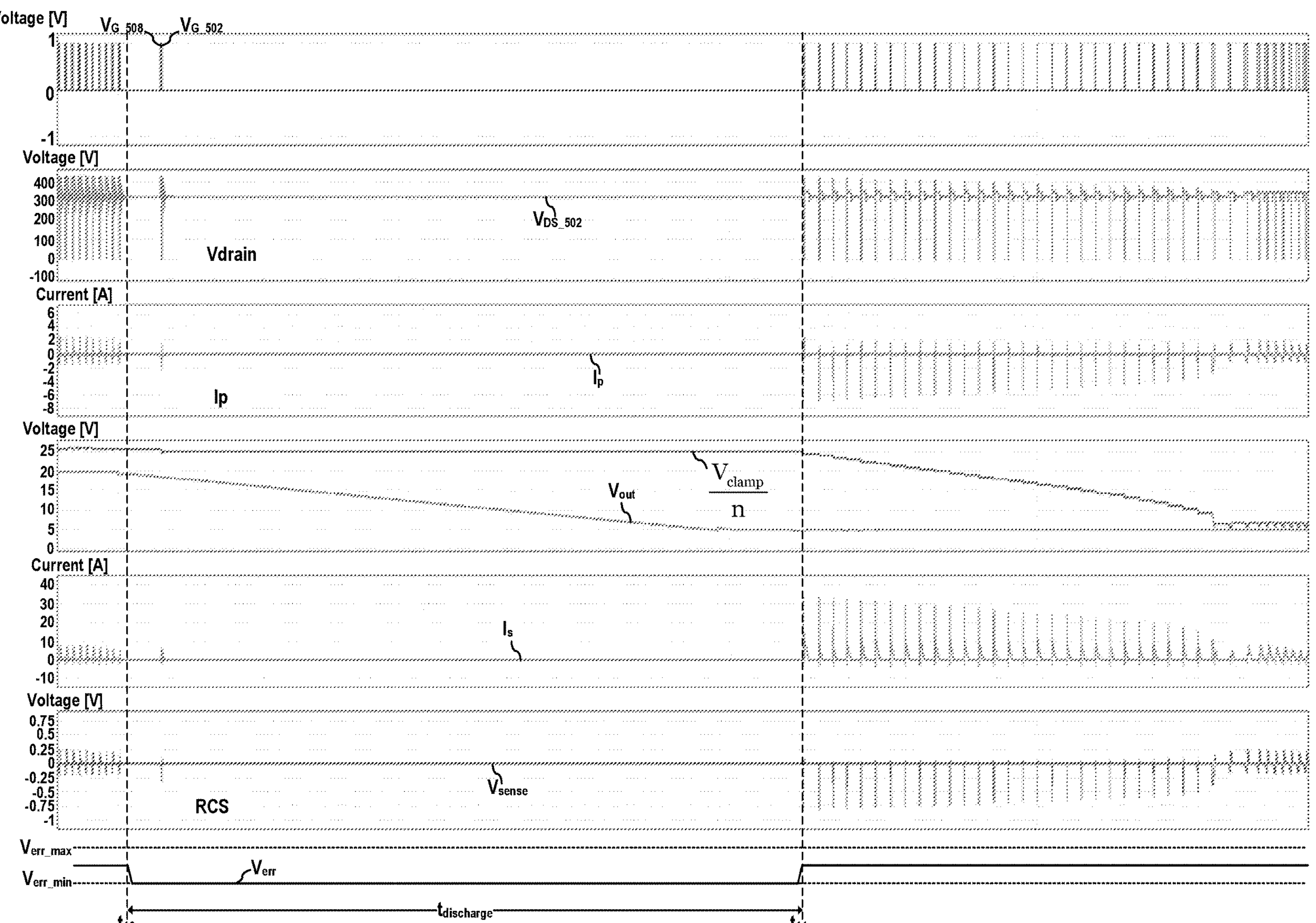

FIG. 10 shows waveforms associated with ACF converter 700 implementing method 600 during a negative output transition, according to an embodiment of the present invention. The negative output transition illustrated in FIG. 10 is from 20 V to 5 V. Negative output transitions from a different starting voltage (e.g., 25 V, 20 V, 18 V, 15 V, 12 V, 10 V, 9 V, or other) and/or to a different lower ending voltage (e.g., 20 V, 18 V, 15 V, 12 V, 10 V, 9 V, or other) are also possible. For example, in an embodiment implemented in a USB compliant system (which specifies possible output voltages of 20 V, 15 V, 9 V, and 5 V), negative output transitions may occur from 20 V to 15 V, 9 V or 5 V, from 15 V to 9 V or 5 V, or from 9 V to 5 V.

As shown in FIG. 10, a negative output transition from 20 V to 5 V begins at time $t_{10}$. When switching is restarted at time $t_{11}$, the current spikes associated with primary current $I_p$ and secondary current $I_s$ reach about −7 A and about 32 A, respectively, compared with −18 A and 88 A using method 550, e.g., as illustrated in FIG. 5G.

As illustrated in FIGS. 9A and 10 (compared with FIGS. 5F and 5G), in some embodiments, the time for discharging voltage $V_{clamp}$ after a short circuit condition or after restarting switching after a negative output transition is longer when implementing method 600 versus method 550. However, the risk of exceeding the safe operating region (SOA) of transistors 502 and 508 maybe advantageously reduced when implementing method 600, e.g., when compared with method 550.

By limiting, during the current bump period $t_B$, the magnitude of the current spikes for the primary current $I_p$ and for the secondary current $I_s$, as well as reducing the duration of the current bump period $t_B$ (e.g., during a short circuit condition or negative output transition), some embodiments advantageously reduce the stress of one or more components of the ACF converter (e.g., 502, 508, 116), which may advantageously extend the life of the ACF converter.

As illustrated in FIG. 5F, the stress over components of the ACF converter (e.g., 502, 508, 116) during a short circuit condition may arise from the current spikes of currents $I_p$ and $I_s$ caused by the reverse current (during the current bump period $t_B$), as well as from the increased peaks of currents $I_p$ and $I_s$ caused by the (forward) primary current (during period $t_A$). Thus, upon detection of an overcurrent condition in the high-side transistor 508 (output "yes" from step 602), some embodiments advantageously activate the soft-start function to limit the current flowing through the low-side transistor 502 during period $t_A$ (e.g., in a similar manner as described with respect to FIG. 5D.

In some embodiments, the soft-start function is activated during a short circuit condition, but not during a negative output transition. For example, the inventors realized that, e.g., as illustrated in FIG. 9A, the error voltage $V_{err}$ during an overcurrent event of the reverse current caused by a short circuit condition is saturated in one state (e.g., high) while, as illustrated in FIG. 9B, the error voltage $V_{err}$ during an overcurrent event caused by a negative output transition is saturated in the opposite state (e.g., low). Thus, some embodiments determine whether ACF converter 700 is in a short circuit condition or in a negative output transition based on the state of the error voltage at the time of the detection of the overcurrent event of the reverse current, and activate the soft-start function only when it is determined that a short circuit condition exist. For example, in some embodiments, during the current bump period $t_B$, the soft-start function is activated when the error voltage $V_{err}$ is saturated high during an overcurrent event of the reverse current, and the soft-start function is not activated otherwise.

Figure 11:
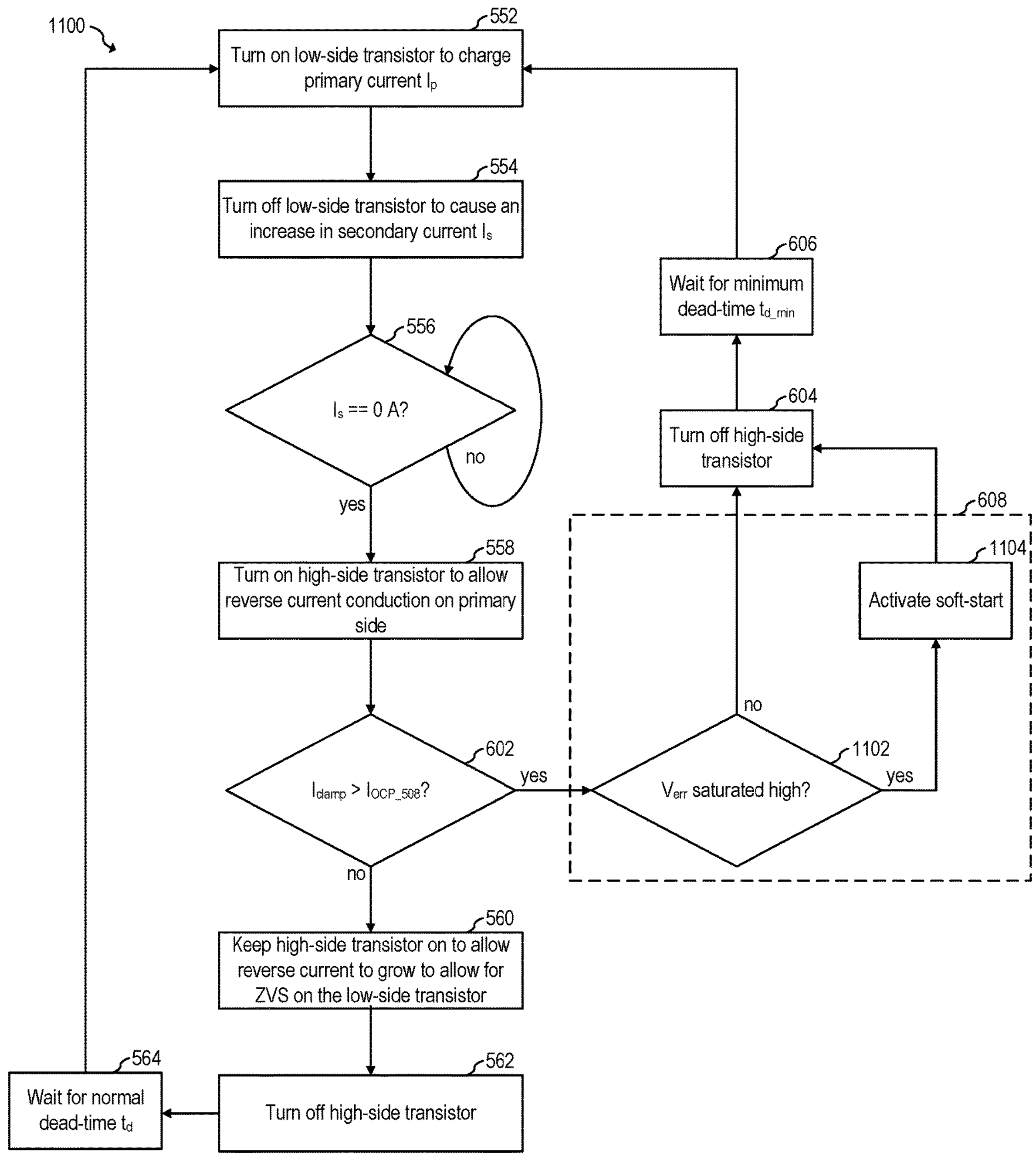
FIG. 11 shows a flow chart of an embodiment method for operating a non-complementary ACF converter, according to an embodiment of the present invention.

FIG. 11 shows a flow chart of embodiment method 1100 for operating a non-complementary ACF converter, according to an embodiment of the present invention. FIG. 11 illustrates a possible implementation of step 608. Method 1100 includes steps 552, 554, 556, 558, 560, 562, 564, 602, 604, 606, 1102, and 1104. In some embodiments, steps 552, 554, 556, 558, 560, 562, 564, 602, 604, and 606 may be performed in a similar manner as in method 600. Primary controller 710 may implement method 1100.

After detection of an overcurrent event of the reverse current (during step 602), the state of error voltage $V_{err}$ is determined during step 1102. If the error voltage $V_{err}$ is saturated high during the overcurrent event, then the soft-start function is activated during step 1104 to, e.g., limit current spikes during period $t_A$.

In some embodiments, when voltage $V_{err}$ is saturated high during step 1102, a short circuit condition signal is asserted to indicate that a short circuit condition has been detected. In some embodiments, when voltage $V_{err}$ is saturated low during step 1102, a negative output transition signal is asserted to indicate that a negative output transition has been detected.

In some embodiments, step 608 may be implemented before, after, or concurrently with steps 604 and/or 606.

The waveforms illustrated in FIGS. 9A and 9B are associated with ACF converter 700 implementing method 600 while implementing step 608 as shown in FIG. 11 (i.e., FIGS. 9A and 9B show waveforms of ACF converter 700 implementing method 1100). As shown in FIG. 9A, since error voltage $V_{err}$ is saturated high during the overcurrent events of transistor 508, the soft-start function is activated at time $t_{12}$, which advantageously limits the spikes of currents $I_p$ and $I_s$ during period $t_A$ compared with method 550 (as illustrated in FIG. 5F).

As shown in FIG. 9B, since error voltage $V_{err}$ is not saturated high during the overcurrent events of transistor 508 (it is saturated low), the soft-start function is not activated during a negative output transition, and the power capability of ACF converter 700 is advantageously not affected during restart of switching at time $t_{11}$.

By using soft-start during startup and during a short circuit condition, some embodiments may advantageously reduce the stress of components of the ACF converter which may advantageously extend the life of the ACF converter.

Figure 12:
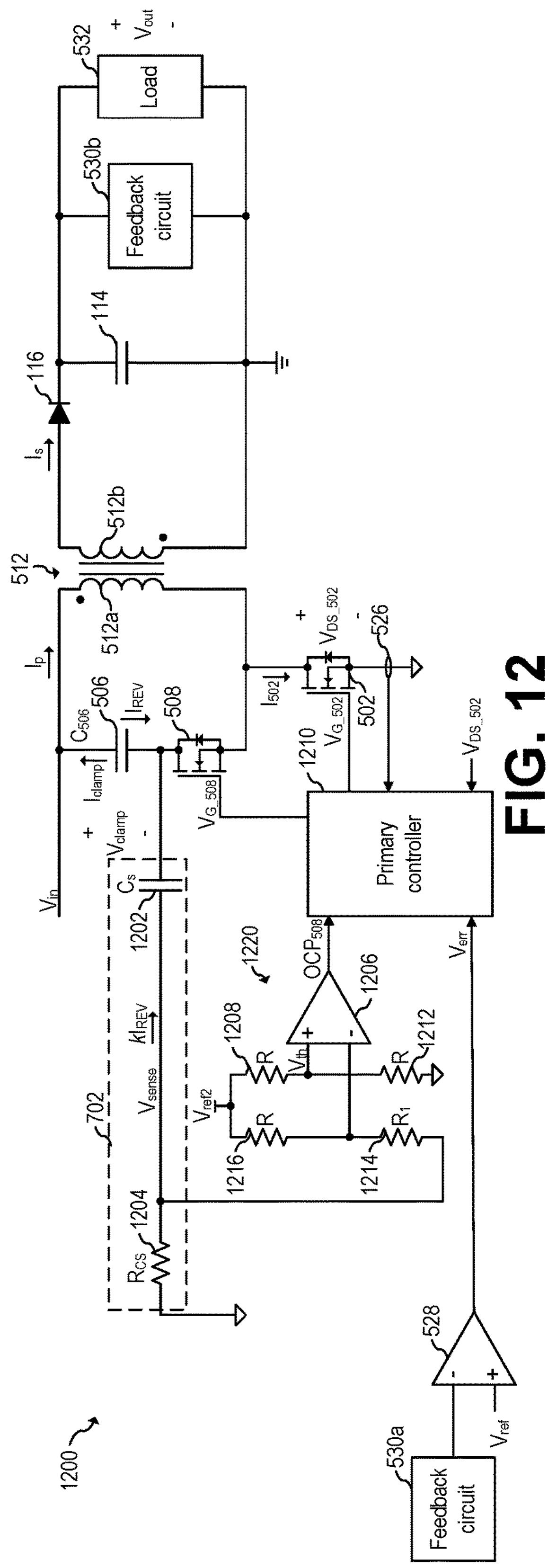
FIG. 12 shows an ACF converter, according to an embodiment of the present invention.

FIG. 12 shows ACF converter 1200, according to an embodiment of the present invention. ACF converter 1200 illustrates a possible implementation of current sensor 702. ACF converter includes primary controller 1210, transistors 502 and 508, capacitors 506 and 114, rectifying diode 116 (or an SR transistor), feedback circuit 530, transformer 512, current sensors 526 and 702, error amplifier 528, and comparator circuit 1220. Comparator circuit 1220 includes comparator 1206, and resistors 1208, 1212, 1214 and 1216. Current sensor 702 includes sense capacitor 1202 and sense resistor 1204. In some embodiments, comparator circuit 1220 is part of primary controller 1210.

As shown in FIG. 12, since sense resistor $R_{CS}$ is relatively small, capacitors 506 and 1202 are dynamically in parallel and form a dynamic capacitive divider with a ratio that may be given by $$k \approx \frac{C_s}{C_{506}}. \tag{7}$$

where $C_s$ represents the capacitance of capacitor 1202 and $C_{506}$ represents the capacitance of capacitor 506. In some embodiments, k is equal to 1000. Other values for k, such as higher than 1000 (e.g., 1010, 2000, or higher) or lower than 1000 (e.g., 980, 900, or lower) may also be used. In some embodiments, k is at least 100.

During the current bump period $t_B$, reverse current $I_{REV}$ is positive and flows through capacitor 506, while a current $k \cdot I_{REV}$ flows through resistor 1204. Thus, during the current bump period $t_B$, voltage $V_{sense}$ is negative (e.g., as illustrated in FIGS. 8, 9A, 9B, and 10).

In some embodiments, since the sense voltage $V_{sense}$ is negative during the sense period ($t_B$), a comparator circuit such as comparator circuit 1220 may be used to compare such sensed voltage $V_{sense}$ with a threshold $V_{th}$. For example, in the embodiment illustrated in FIG. 12, the threshold voltage $V_{th}$ may be given by $$V_{th} = \frac{V_{ref2}}{2}\left(1 - \frac{R_1}{R}\right); R_1 > R, . \tag{8}$$

where R represents the resistance of each of resistors 1208, 1212 and 1216, and $R_1$ represents the resistance of resistor 1214.

In some embodiments, OCP threshold $I_{OCP\_508}$ (e.g., used during step 602) may be given by $$I_{OCP\_508} = \frac{V_{th}}{k \cdot R_{CS}}. \tag{9}$$

As a non-limiting example, in the embodiment illustrated in FIGS. 9A, and 10, threshold voltage $V_{th}$ is set to −500 mV.

When the magnitude of $V_{sense}$ exceeds threshold $V_{th}$, signal $OCP_{508}$ is asserted (e.g., high). Signal $OCP_{508}$ asserting corresponds to an output “yes” in step 602.

As illustrated in FIG. 12, in some embodiments, the generation of signal $OCP_{508}$ (e.g., step 602) is performed cycle-by-cycle. Thus, in some embodiments, the decision to turn off the high-side transistor 604 early (step 604) is performed cycle-by-cycle based on the magnitude of the reverse current $I_{REV}$ during the current bump period $t_B$.

In some embodiments, the values for R, $R_1$, $R_{CS}$, $C_s$, $C_{506}$, $V_{th}$ are selected to have a suitable threshold $V_{th}$ to detect an overcurrent event in reverse current $I_{REV}$ while avoiding the introduction of significant delay in the measurement. For example, in some embodiments, the time constant $R_{CS} \cdot C_s$ is kept short (e.g., in the tens of ns, such as between 10 ns to 50 ns), to avoid introducing a significant delay (e.g., since it may be desirable to turn act quickly (e.g., step 606) after comparing the reverse current $I_{REV}$ with a threshold (e.g., step 602).

In some embodiments, the current $I_{REV}$ to be sensed may be in the tens of amps, capacitance $C_{506}$ is in the hundreds of nF, capacitance $C_s$ is in the hundreds of pF, resistance RCS is lower than or equal to 100 Ω, resistances R and $R_1$ may be in the range of tens of kΩ, reference voltage Vref2 may be in the range of a few volts (e.g., less than 10 V), threshold voltage Vth may be in the range of hundreds of mV (e.g., less than 1 V).

By using a sensing capacitor (e.g., 1202) that is referred to ground for sensing the reverse current $I_{REV}$ flowing through high-side transistor 508, some embodiments are advantageously capable of limiting current spikes during the current bump period $t_B$ without using a current transformer (which may be expensive and bulky).

In some embodiments, primary controller 1210 may be implemented in an integrated circuit. For example, in an embodiment, an integrated circuit includes elements 1206, 1208, 1210, 1212, 1214, and 1216, while the other elements are implemented external to the integrated circuit. For example, in some embodiments, elements 530 and 528 may be housed in the same package. Other implementations are also possible. For example, in some embodiments, the integrated circuit further includes transistors 502 and 508.

Example embodiments of the present invention are summarized here. Other embodiments can also be understood from the entirety of the specification and the claims filed herein.

Example 1. A method for operating an active-clamp flyback (ACF) converter, the method including: turning on a low-side transistor that is coupled between a first terminal of a primary winding of a transformer and a reference terminal to cause a forward current to enter the primary winding via a second terminal of the primary winding and exit the primary winding via the first terminal of the primary winding; after turning on the low-side transistor, turning off the low-side transistor; after turning off the low-side transistor, turning on a high-side transistor that is coupled between the first terminal of the primary winding and a first terminal of a clamp capacitor to cause a reverse current to flow through the primary winding, where a second terminal of the clamp capacitor is coupled to the second terminal of the primary winding, and where the reverse current has opposite direction than the forward current; and after turning on the high-side transistor, when an overcurrent of the reverse current is not detected, keeping the high-side transistor on for a first period of time, and turning off the high-side transistor after the first period of time, and when the overcurrent of the reverse current is detected, turning off the high-side transistor without keeping the high-side transistor on for the first period of time.

Example 2. The method of example 1, further including: when the overcurrent of the reverse current is not detected, turning on the low-side transistor a first dead-time after turning off the high-side transistor; and when the overcurrent of the reverse current is detected, turning on the low-side transistor a second dead-time after turning off the high-side transistor, where the second dead-time is shorter than the first dead-time.

Example 3. The method of one of examples 1 or 2, where the second dead-time is at least three times shorter than the first dead-time.

Example 4. The method of one of examples 1 to 3, where the second dead-time correspond to a minimum dead-time sufficient to prevent cross-conduction between the high-side transistor and the low-side transistor.

Example 5. The method of one of examples 1 to 4, where turning on the high-side transistor includes turning on the high-side transistor when a secondary current flowing through a secondary winding of the transformer drops to about 0 A.

Example 6. The method of one of examples 1 to 5, further including: determining an error voltage based on an output voltage at an output terminal that is coupled to a secondary winding of the transformer; and determining a short circuit condition when the error voltage is saturated to a first voltage when the overcurrent of the reverse current is detected.

Example 7. The method of one of examples 1 to 6, further including: determining a negative output transition when the error voltage is saturated to a second voltage when the overcurrent of the reverse current is detected; and asserting a negative output transition signal in response to determining the negative output transition.

Example 8. The method of one of examples 1 to 7, further including regulating the output voltage based on the error voltage.

Example 9. The method of one of examples 1 to 8, further including activating a soft-start function to limit a power of the ACF converter when the short circuit condition is determined.

Example 10. The method of one of examples 1 to 9, further including performing synchronous rectification using a synchronous rectifier that is coupled to a secondary winding of the transformer.

Example 11. The method of one of examples 1 to 10, further including: sensing a sense voltage at the first terminal of the clamp capacitor using a sense capacitor coupled between the first terminal of the clamp capacitor and the reference terminal; asserting an overcurrent signal using a comparator circuit having an input receiving the sense voltage; and detecting the overcurrent of the reverse current when the overcurrent signal is asserted.

Example 12. An active-clamp flyback (ACF) converter including: a transformer including primary and secondary windings; a low-side transistor having a current path coupled between a first terminal of the primary winding and a reference terminal; a clamp capacitor coupled to a second terminal of the primary winding; a high-side transistor having a current path coupled between the first terminal of the primary winding and the clamp capacitor; a current sensor configured to sense a reverse current flowing through the clamp capacitor, the reverse current having a direction from the clamp capacitor to the first terminal of the primary winding; and a primary controller configured to: turn on the low-side transistor to cause a forward current to enter the primary winding via the second terminal of the primary winding and exit the primary winding via the first terminal of the primary winding, after turning on the low-side transistor, turn off the low-side transistor, after turning off the low-side transistor, turn on the high-side transistor to cause the reverse current to flow through the primary winding, and after turning on the high-side transistor, detect whether an overcurrent of the reverse current exists based on an output of the current sensor, when the overcurrent of the reverse current is not detected, keep the high-side transistor on for a first period of time, and turn off the high-side transistor after the first period of time, and when the overcurrent of the reverse current is detected, turn off the high-side transistor without keeping the high-side transistor on for the first period of time.

Example 13. The ACF converter of example 12, where the current sensor includes: a sense capacitor coupled to an intermediate node that is coupled between the clamp capacitor and the current path of the high-side transistor; and a sense resistor coupled between the sense capacitor and the reference terminal.

Example 14. The ACF converter of one of examples 12 or 13, further including a comparator having a first input configured to receive a threshold voltage, a second input coupled to be coupled to the sense capacitor, and an output configured to provide an overcurrent detection signal.

Example 15. The ACF converter of one of examples 12 to 14, where the primary controller is configured to detect whether an overcurrent of the reverse current exists based on the overcurrent detection signal.

Example 16. The ACF converter of one of examples 12 to 15, where the sense capacitor is at least 100 times smaller than the clamp capacitor.

Example 17. The ACF converter of one of examples 12 to 16, where a time constant associated with the sense capacitor and the sense resistor is between 10 ns and 50 ns.

Example 18. The ACF converter of one of examples 12 to 17, further including a rectifying diode coupled to the secondary winding.

Example 19. The ACF converter of one of examples 12 to 18, further including a synchronous rectifier (SR) transistor coupled to the secondary winding.

Example 20. The ACF converter of one of examples 12 to 19, further including a feedback circuit coupled to the secondary winding, the feedback circuit configured to provide an error voltage, where the primary controller is configured to activate a soft-start function when the error voltage is saturated to a first voltage when the overcurrent of the reverse current is detected.

Example 21. The ACF converter of one of examples 12 to 20, where the primary controller is further configured to: when the overcurrent of the reverse current is not detected, turn on the low-side transistor a first dead-time after turning off the high-side transistor; and when the overcurrent of the reverse current is detected, turn on the low-side transistor a second dead-time after turning off the high-side transistor, where the second dead-time is shorter than the first dead-time.

Example 22. The ACF converter of one of examples 12 to 21, where the low-side transistor and the high-side transistor are metal-oxide semiconductor field-effect transistors (MOSFETs) or GaN transistors.

Example 23. An integrated circuit including: a reference terminal configured to receive a reference voltage; a voltage sensing terminal configured to be coupled to a clamp capacitor via a sense capacitor and configured to be coupled to the reference terminal via a sense resistor; a first control terminal configured to be coupled to a control terminal of a high-side transistor having a current path coupled between the voltage sensing terminal and a first terminal of a primary winding of a transformer; a second control terminal configured to be coupled to a control terminal of a low-side transistor having a first current path terminal coupled to the current path of the high-side transistor; a comparator having a first input configured to receive a threshold voltage, a second input coupled to the voltage sensing terminal, and an output configured to provide an overcurrent detection signal; and a primary controller configured to: turn on the low-side transistor to cause a forward current to enter the primary winding via a second terminal of the primary winding and exit the primary winding via the first terminal of the primary winding, after turning on the low-side transistor, turn off the low-side transistor, after turning off the low-side transistor, turn on the high-side transistor to cause a reverse current to flow through the primary winding, the reverse current having opposite direction to the forward current, and after turning on the high-side transistor, detect whether an overcurrent of the reverse current exists based on the overcurrent detection signal, when the overcurrent detection signal is deasserted, keep the high-side transistor on for a first period of time, and turn off the high-side transistor after the first period of time, and when the overcurrent detection signal is asserted, turn off the high-side transistor without keeping the high-side transistor on for the first period of time.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for operating an active-clamp flyback (ACF) converter, the method comprising:

generating a forward current through a primary winding of a transformer for a first duration;

generating a reverse current opposite the forward current through the primary winding for a second duration at an ending of the first duration, wherein an ending of the second duration corresponds to detecting an overcurrent condition at the reverse current or elapsing of a set time duration; and stopping the generating of the reverse current for a third duration in response to not detecting an overcurrent condition at the reverse current, the third duration being equal to the set time duration and being after the second duration.

2. The method of claim 1, wherein generating the forward current comprises turning on a low-side transistor coupled between a first terminal of the primary winding and a reference terminal, and wherein a beginning of the second duration corresponds to a secondary current flowing through a secondary winding of the transformer dropping to about 0 amps.

3. The method of claim 2, wherein the generating the reverse current comprises turning off the low-side transistor.

4. The method of claim 1, wherein the forward current enters the primary winding via a second terminal of the primary winding and exits via a first terminal of the primary winding.

5. The method of claim 1, wherein generating the reverse current comprises turning on a high-side transistor coupled between a first terminal of the primary winding and a first terminal of a clamp capacitor.

6. The method of claim 5, wherein a second terminal of the clamp capacitor is coupled to a second terminal of the primary winding.

7. The method of claim 1, further comprising generating a second forward current through the primary winding for a fourth duration, wherein an elapsed duration before a beginning of the fourth duration is shorter in response to detecting the overcurrent condition than in response to not detecting the overcurrent condition.

8. The method of claim 7, wherein the elapsed duration before the beginning of the fourth duration is at least three times shorter in response to detecting the overcurrent condition than in response to not detecting the overcurrent condition.

9. The method of claim 7, wherein the elapsed duration before the beginning of the fourth duration, in response to detecting the overcurrent condition, is greater than a minimum duration to prevent cross-conduction between a high-side transistor and a low-side transistor of the ACF converter used to generate the forward current and the reverse current, respectively.

10. The method of claim 1, further comprising activating a soft-start function to limit a power of the ACF converter in response to detecting an error voltage condition and the overcurrent condition, the error voltage condition corresponding to a voltage at an output terminal coupled to a secondary winding of the transformer being saturated at a first voltage.

11. The method of claim 1, further comprising performing synchronous rectification using a synchronous rectifier coupled to a secondary winding of the transformer.

12. An active-clamp flyback (ACF) converter comprising:

a transformer comprising a primary winding and a secondary winding;

a low-side transistor coupled to the primary winding;

a clamp capacitor coupled to the primary winding;

a high-side transistor coupled to the primary winding and the clamp capacitor;

a current sensor configured to sense a reverse current flowing through the clamp capacitor, the reverse current having a direction from the clamp capacitor to a first terminal of the primary winding; and a primary controller configured to:

generate a forward current through the primary winding for a first duration;

generate a reverse current opposite the forward current through the primary winding for a second duration at an ending of the first duration, wherein an ending of the second duration corresponds to detecting an overcurrent condition at the reverse current or elapsing of a set time duration; and stop the reverse current for a third duration in response to not detecting an overcurrent condition at the reverse current, the third duration being equal to the set time duration and being after the second duration.

13. The ACF converter of claim 12, further comprising:

a rectifying diode coupled to the secondary winding; and a synchronous rectifier (SR) transistor coupled to the secondary winding.

14. The ACF converter of claim 12, further comprising a feedback circuit configured to monitor a voltage at an output terminal coupled to the secondary winding, wherein the primary controller is configured to activate a soft-start function to limit a power of the ACF converter in response to detecting the overcurrent condition and an error voltage condition at the output terminal.

15. The ACF converter of claim 12, wherein the primary controller is further configured to generate a second forward current through the primary winding for a fourth duration, wherein an elapsed duration before a beginning of the fourth duration is shorter in response to detecting the overcurrent condition than in response to not detecting the overcurrent condition.

16. The ACF converter of claim 12, wherein one or both of the low-side transistor and the high-side transistor is a metal-oxide semiconductor field-effect transistor (MOSFET) or a Gallium Nitrite (GaN) transistor.

17. An integrated circuit, comprising:

a reference terminal configured to receive a reference voltage;

a voltage sensing terminal configured to be coupled to a clamp capacitor via a sense capacitor and configured to be coupled to the reference terminal via a sense resistor;

a first control terminal configured to be coupled to a control terminal of a high-side transistor having a current path coupled between the voltage sensing terminal and a first terminal of a primary winding of a transformer;

a second control terminal configured to be coupled to a control terminal of a low-side transistor having a first current path terminal coupled to the current path of the high-side transistor;

a comparator having a first input configured to receive a threshold voltage, a second input coupled to the voltage sensing terminal, and an output configured to provide an overcurrent detection signal; and a primary controller configured to generate, by the low-side transistor, a forward current through the primary winding for a first duration;

generate, by the high-side transistor, a reverse current opposite the forward current through the primary winding for a second duration at an ending of the first duration, wherein an ending of the second duration corresponds to detecting an overcurrent condition at the reverse current or elapsing of a set time duration; and stop the reverse current for a third duration in response to not detecting an overcurrent condition at the reverse current, the third duration being equal to the set time duration and being after the second duration.

18. The integrated circuit of claim 17, wherein a beginning of the second duration corresponds to a secondary current flowing through a secondary winding of the transformer dropping to about 0 amps.

19. The integrated circuit of claim 17, wherein the primary controller is further configured to generate a second forward current through the primary winding for a fourth duration, wherein an elapsed duration before a beginning of the fourth duration is shorter in response to detecting the overcurrent condition than in response to not detecting the overcurrent condition.

20. The integrated circuit of claim 17, further comprising a feedback circuit configured to monitor a voltage at an output terminal coupled to a secondary winding of the transformer, wherein the primary controller is configured to activate a soft-start function in response to detecting the overcurrent condition and an error voltage condition at the output terminal.

* * * * *

UNITED STATES PATENT AND TRADEMARK OFFICE

CERTIFICATE OF CORRECTION

PATENT NO. : 11,699,956 B2
APPLICATION NO. : 17/989877
DATED : July 11, 2023
INVENTOR(S) : Adragna et al.

It is certified that error appears in the above-identified patent and that said Letters Patent is hereby corrected as shown below:

On the Title Page

Item (71), in Column 1, in "Applicant", Line 1, delete "S.r.I.," and insert -- S.r.l., --.

Item (73), in Column 1, in "Assignee", Line 1, delete "STMicroelectronios" and insert -- STMicroelectronics --.

Signed and Sealed this
Tenth Day of October, 2023

Katherine Kelly Vidal

Katherine Kelly Vidal
*Director of the United States Patent and Trademark Office*